US012642248B2

(12) United States Patent
Wilkerson

(10) Patent No.: US 12,642,248 B2
(45) Date of Patent: Jun. 2, 2026

(54) TEMPERATURE-REGULATED LIQUID CONTAINER

(71) Applicant: Larry James Wilkerson, Steamboat Rock, IA (US)

(72) Inventor: Larry James Wilkerson, Steamboat Rock, IA (US)

( * ) Notice: Subject to any disclaimer, the term of this patent is extended or adjusted under 35 U.S.C. 154(b) by 0 days.

(21) Appl. No.: 19/081,571

(22) Filed: Mar. 17, 2025

(65) Prior Publication Data

US 2025/0204486 A1 Jun. 26, 2025

Related U.S. Application Data

(63) Continuation-in-part of application No. 18/060,923, filed on Dec. 1, 2022, now Pat. No. 12,250,933.

(60) Provisional application No. 63/285,037, filed on Dec. 1, 2021.

(51) Int. Cl.
*A01K 7/02* (2006.01)
*A01K 7/04* (2006.01)

(52) U.S. Cl.
CPC ............. *A01K 7/027* (2013.01); *A01K 7/022* (2013.01); *A01K 7/04* (2013.01)

(58) Field of Classification Search
CPC ........... A01K 7/027; A01K 7/022; A01K 7/04
See application file for complete search history.

(56) References Cited

U.S. PATENT DOCUMENTS

| | | | | |
|---|---|---|---|---|
| 5,983,889 | A | * 11/1999 | Thomas | A01K 7/027 |
| | | | | 126/378.1 |
| 7,281,494 | B1 * | 10/2007 | Connerley | A01K 7/02 |
| | | | | 119/77 |
| 10,383,311 | B1 * | 8/2019 | Kane | A01K 39/024 |
| 11,317,604 | B1 * | 5/2022 | Pang | A01K 7/022 |
| 11,337,405 | B1 * | 5/2022 | Dinger | A01K 7/025 |
| 2004/0118356 | A1* | 6/2004 | Krishnamurthy | A01K 7/025 |
| | | | | 119/74 |
| 2006/0207515 | A1* | 9/2006 | Palett | A01K 7/02 |
| | | | | 119/78 |
| 2010/0276410 | A1* | 11/2010 | Hudson | A01K 63/06 |
| | | | | 250/504 R |
| 2019/0289819 | A1* | 9/2019 | Ranck | A01K 7/025 |
| 2019/0373852 | A1* | 12/2019 | Figgins | A01K 7/04 |
| 2020/0084999 | A1* | 3/2020 | Yoo | C02F 1/003 |
| 2020/0085002 | A1* | 3/2020 | Yoo | A01K 7/02 |
| 2020/0085003 | A1* | 3/2020 | Yoo | A01K 7/027 |

(Continued)

*Primary Examiner* — Monica L Perry
*Assistant Examiner* — Aaron M Rodziwicz
(74) *Attorney, Agent, or Firm* — Fredrikson & Byon, P.A.

(57) ABSTRACT

A temperature regulation system including a first body forming a first interior cavity and a second body forming a second interior cavity. The first body includes a first opening defined in a wall of the first body. The first interior cavity is in fluidic communication with the first opening and the first interior cavity is configured to contain a liquid. The second body includes a second opening defined within a wall of the second body. A first temperature control module can be disposed within the second body and can include a fan. The first temperature control module is in fluidic communication of a fluid comprising air with the first interior cavity via the first and second openings. The fan is configured to direct a flow of air from the second interior cavity to the first interior cavity at a location adjacent the liquid.

20 Claims, 19 Drawing Sheets

(56)    References Cited

U.S. PATENT DOCUMENTS

| | | | |
|---|---|---|---|
| 2020/0085004 A1* | 3/2020 | Yoo | C02F 1/325 |
| 2020/0085005 A1* | 3/2020 | Yoo | A01K 7/025 |
| 2020/0085006 A1* | 3/2020 | Yoo | A01K 7/022 |
| 2020/0085014 A1* | 3/2020 | Yoo | B67D 1/0004 |
| 2020/0086244 A1* | 3/2020 | Yoo | B01D 35/02 |
| 2020/0087135 A1* | 3/2020 | Youn | B01D 29/15 |
| 2020/0091756 A1* | 3/2020 | Yoo | A01K 7/025 |
| 2020/0091769 A1* | 3/2020 | Yoo | H02J 50/10 |
| 2021/0144963 A1* | 5/2021 | Wang | C02F 1/42 |
| 2021/0144964 A1* | 5/2021 | Wang | B01D 39/1623 |
| 2021/0179413 A1* | 6/2021 | Goodman | A01K 7/025 |
| 2021/0212287 A1* | 7/2021 | Wang | A01K 7/025 |
| 2021/0345582 A1* | 11/2021 | Yoo | G01C 9/02 |
| 2023/0157259 A1* | 5/2023 | Xue | A01K 7/025 |
| | | | 119/74 |

* cited by examiner

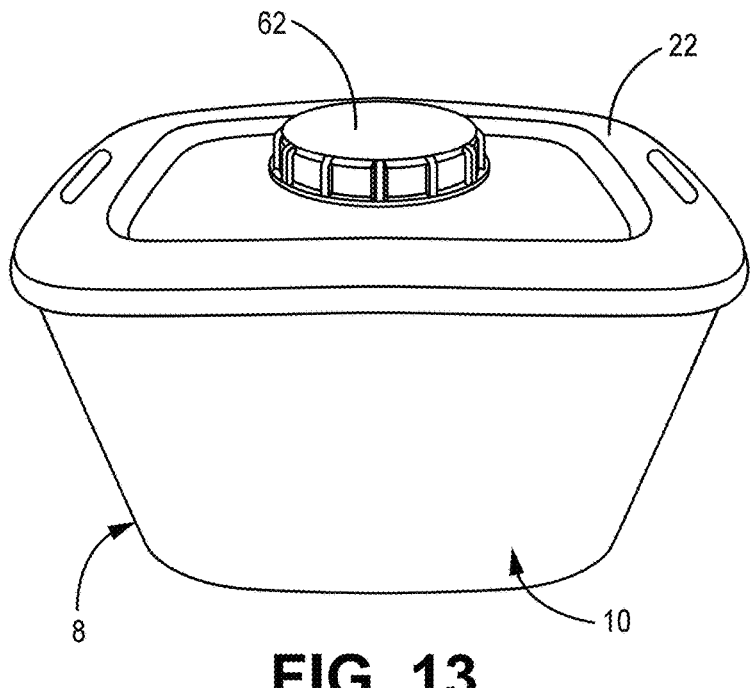
FIG. 13
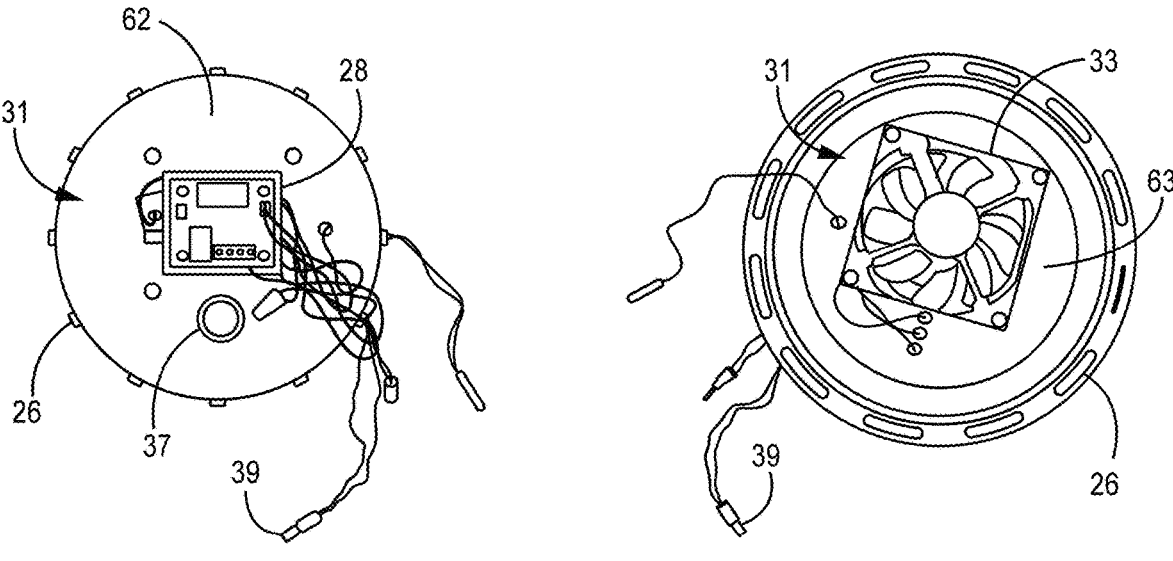
FIG. 14A          FIG. 14B

310

TEMPERATURE-REGULATED LIQUID CONTAINER

CROSS-REFERENCE TO RELATED APPLICATIONS

This application claims priority as a continuation-in-part to U.S. patent application Ser. No. 18/060,923, filed Dec. 1, 2022 and entitled "Temperature-Regulated Liquid Container," which claims the benefit under 35 U.S.C. § 119(e) to U.S. Provisional Application 63/285,037, filed Dec. 1, 2021 and entitled "Freeze Resistant Water Container," the disclosures of each of which are hereby incorporated herein by reference in their entireties.

FIELD

The various embodiments herein relate to temperature-regulated liquid containers, and more particularly to temperature-regulated watering vessels for livestock.

BACKGROUND

Many watering troughs are open-topped containers of varying size, including various examples ranging from 15 gallons to 600 gallons, and are used to provide access to water for both livestock and domesticated animals. In selecting a watering trough, owners may weigh a variety of considerations, such as convenience of use, low cost, durability, portability, and tradition. The environment in which the containers will be used is also a factor which may be considered. As a result, containers may be designed for use in many different environments, each posing unique maintenance needs and challenges. Depending on these environmental conditions, debris such as dust, hay, leaves, food droppings, algae contamination, or animal excrement may enter the open-topped containers and contaminate the liquid therein, making the water unsuitable for animal consumption. This contamination results in necessary cleaning of the open-topped liquid container, which can occur on a regular basis, such as, for example, a weekly basis. During the cleaning process, the water may need to be drained from the container, which may result in the loss of several gallons of water.

During colder temperatures, the water within these containers may freeze, which poses an additional challenge to the maintenance of watering troughs. If the liquid freezes, the owner or maintenance provider may need to break the ice in order to remove the water from the trough, which requires additional labor and tools. Water from alternative sources may also need to be provided to the animals. To prevent the liquid inside the containers from freezing, different heating element configurations may be integrated into the liquid containers. Some liquid containers include heating elements submerged in water. Other configurations for heating elements include floating heating elements, bubblers, de-icers, and heated containers. Submersible heating elements are designed to heat the entire volume of the liquid within the container. Floating bubblers agitate the surface of the water. Floating heaters or de-icers heat the surface of the water. These solutions may result in greater operating costs, as many of these devices operate using a higher wattage, generally, from 500 watts to 1500 watts, which run continuously to supply heat to large volumes of water. Furthermore, some livestock owners may have concerns regarding the safety of the livestock drinking from a watering trough with a submerged electrical element.

There is a need in the art for liquid containers with improved heating configurations and reduced operating costs.

BRIEF SUMMARY

Discussed herein are various liquid containers with temperature regulation modules.

In Example 1, a temperature regulation system comprises a first body forming a first interior cavity with a first opening defined in a wall of the first body, wherein the first body interior cavity is in fluidic communication with the first opening. The temperature regulation system comprises a second body forming a second interior cavity, the second body comprising a second opening defined within a wall of the second body. The temperature regulation system comprises a first temperature control module disposed within the second body, wherein the first temperature control module is in fluidic communication with the first interior cavity via the first and second openings.

Example 2 relates to the temperature regulation system according to Example 1, wherein the first temperature control module comprises a temperature sensor, a fan, and a positive temperature coefficient heating element.

Example 3 relates to the temperature regulation system according to Example 2, wherein the first body comprises a removable top panel and the second body is coupled to the removable top panel of the first body Example 4 relates to the temperature regulation system of Example 2, wherein an external surface of the second body is coupled to an interior surface of the first interior cavity of the first body.

Example 5 relates to the temperature regulation system of Example 2, wherein an external surface of the second body is coupled to an exterior surface of the first body.

Example 6 relates to the temperature regulation system of Example 2, wherein the first and second openings are disposed above a maximum height of a liquid disposed within the interior cavity of the first body.

Example 7 relates to the temperature regulation system of Example 1, wherein the temperature regulation system further comprises a water level sensor for measuring water levels and regulating electricity to the first temperature control module.

Example 8 relates to the temperature regulation system of Example 1, wherein the second body is a removable cap.

Example 9 relates to the temperature regulation system of Example 2, wherein the temperature regulation system further comprises a halogen bulb coupled to the first body of the temperature regulation system.

Example 10 relates to the temperature regulation system of Example 9, wherein the first body of the temperature regulation system is insulated.

Example 11 relates to the temperature regulation system of Example 2, wherein the temperature regulation system further comprises a water access opening within the first body covering panel.

Example 12 relates to the temperature regulation system of Example 1, wherein the temperature regulation system further comprises a drinking bowl coupled to the first body, wherein the temperature control module is in fluidic access with the drinking bowl.

In Example 13, a temperature regulation system for an animal watering device comprises a liquid container forming a first interior cavity and a first temperature control module in fluidic access with the first interior cavity of the liquid container, wherein the first temperature control module is coupled to the liquid container.

Example 14 relates to the temperature regulation system of Example 13, wherein the liquid container comprises a removable top panel and the temperature control module is coupled to an interior surface of the removable top panel of the liquid container.

Example 15 relates to the temperature regulation system of Example 13, wherein the temperature regulation system further comprises a water level sensor for measuring water levels and regulating electricity to the first temperature control module.

Example 16 relates to the temperature regulation system of Example 13, wherein the first temperature control module is coupled to the liquid container above a maximum height to which a liquid may be filled in the liquid container.

Example 17 relates to the temperature regulation system of Example 15, wherein the first temperature control module further comprises a drinking bowl coupled to the liquid container, wherein the temperature control module is in fluidic access with the drinking bowl.

Example 18 relates to a method of regulating temperature in a liquid container comprising configuring a temperature sensor to recognize a predetermined air low temperature threshold, configuring a temperature sensor to recognize a predetermined air high temperature threshold, adding heated air to the liquid container when the temperature sensor detects the low air temperature threshold and ceasing the addition of heated air to the liquid container when said temperature sensor detects the air high temperature threshold, The liquid container comprises a first body forming a first interior cavity, the first body comprising a first opening defined in a wall of the first body, wherein the first interior cavity is in fluidic communication with the first opening, a second body forming a second interior cavity, the second body comprising a second opening defined within a wall of the second body, and a first temperature control module disposed within the second body, wherein the first temperature control module is in fluidic access with the first interior cavity via the first and second openings.

Example 19 relates to the method of regulating temperature of Example 18, the method further comprising configuring a water level sensor coupled to the first body to recognize a user-selected water level threshold.

Example 20 relates to the method of regulating temperature of Example 19, further comprising discontinuing an electrical connection of a heating module when a water level threshold is not recognized by the water level sensor.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

FIG. 13 is a perspective view of a liquid container, according to a further embodiment.

FIG. 14A and FIG. 14B are front views of a cap of a second body comprising a heating module of a liquid container.

DETAILED DESCRIPTION

The various embodiments herein relate to temperature-regulated liquid containers (hereinafter referred to as a "liquid container" and "liquid containers"). In the various liquid container implementations herein, the elements regulating the temperature of the liquid container are housed in a second body coupled to the liquid container.

Figure 1A:
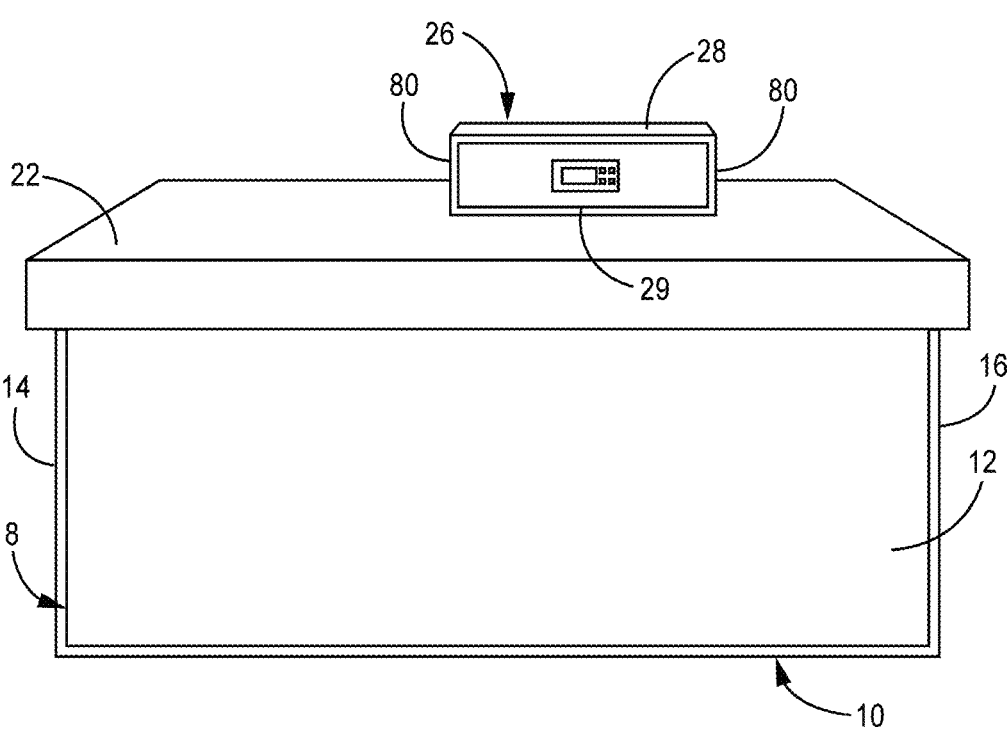
FIG. 1A and FIG. 1B are front and rear views of a freeze-resistant liquid container, according to one embodiment.
Figure 1B:
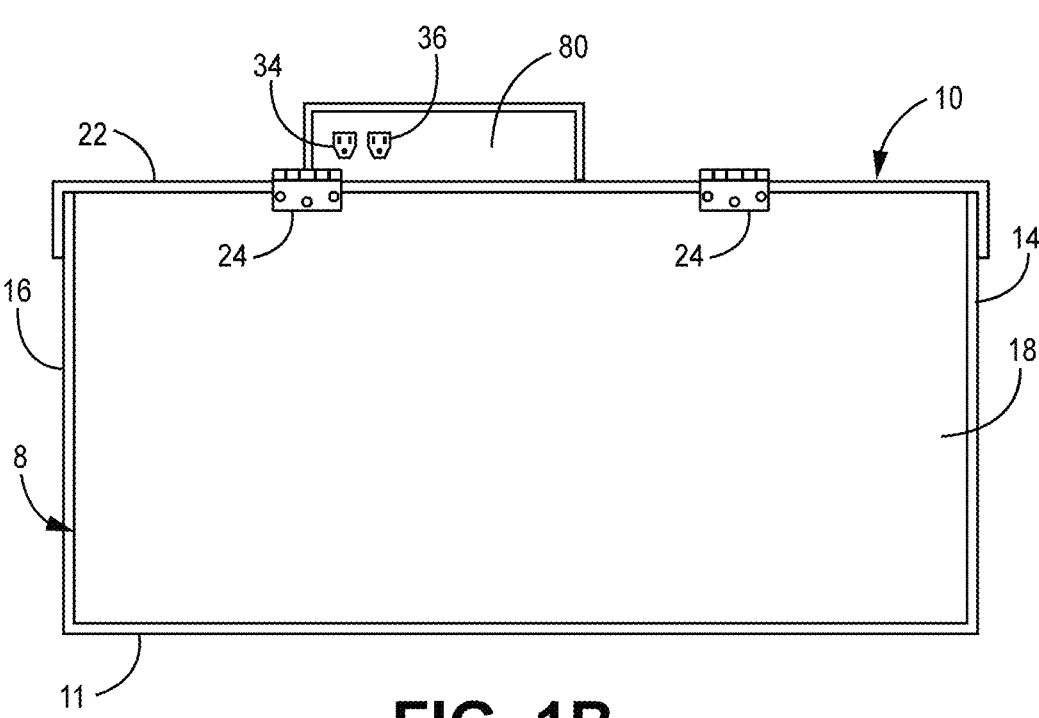

FIG. 1A and FIG. 1B are front and rear views of one exemplary embodiment of a temperature-regulated watering apparatus 8. The apparatus 8 may have two bodies: a first body (or "container" or "liquid container") 10 and a second body 26. The first body 10 includes a base 11 and multiple walls (or "panels") 12, 14, 16, forming a first interior cavity (not shown) defined within the base and walls 11, 12, 14, 16. The base 11 is the bottom or underside component of the body 10 (to which the walls 12, 14, 16 are connected). The first interior cavity (not shown) may be used to store or house liquid including, for example, water. In some embodiments, the apparatus 8 can be a watering trough 8. The first body 10 may be rectangular, square, round, or other known shapes. The first body 10 may be made from metal, wood, plastic, or other materials. It may be multiple parts assembled together, or may be a molded to the desired shape of the liquid container.

As mentioned above, the first body 10 can include a front panel 12, a rear panel 18, and side panels 14, 16. In some embodiments, the first body 10 can include a lid 22, which may be hingedly attached to the rear panel 18. The lid 22 can then pivot about a hinge 24 pivot axis, providing access to the interior cavity. In other embodiments, the lid 22 may be attached by any other known means of attachment, such as a latch, or may not be attached to the first body 10 at all. To access the first interior cavity (not shown), the lid 22 may need to be lifted or removed entirely from the first body 10. In some embodiments, the lid 22 may be kept open by leaning the lid 22 against a structure (not pictured) to keep the lid 22 propped open. The lid 22 may be secured along the front panel by latches, screws, or other mechanical fasteners.

In various implementations, the liquid container 10 may be filled to any level selected by a user. When liquid fills the liquid container 10, a space may remain between the surface of the liquid and the interior surface of the lid. The temperature of the air in this space may be used to calculate the air temperature of the first cavity (not shown) in the first body 10.

In various embodiments herein, the watering apparatus 8 includes a second body 26. The second body 26 can be formed by a base 29 and at least one wall 80, which form a second interior cavity (not shown). The second interior cavity can house a heating module or apparatus. Any surface of the second body 26 may be coupled to a surface of the first body 10. For example, the base 29 of the second body 26 may be coupled to the covering or lid 22 of the first body 10 as depicted in FIGS. 1A and 1B. Alternatively, in other embodiments, any wall 29, 80 of the second body 26 may be coupled to any wall 12, 14, 16, 18 of the first body 10. In further alternatives, the second body 26 may be structured such that a surface of the first body 10 is also a surface of the second body 26. The second body 26 may be square, round, or other known shapes. In some embodiments, the second body 26 may be the same shape as the first body 10. In other embodiments, the second body 26 may be a different shape than the first body 10. Like the first body 10, the second body 26 may be formed by multiple parts assembled together or may be molded to form a second body 26 shape. The material of the second body 26 may be wood, plastic, or any other known materials. In certain embodiments, the second body 26 may be made of the same material as the first body 10, or it may be made of a different material. The second body 26 houses the heating module or apparatus that regulates the temperature of air above the liquid in the liquid container 10. At least one electrical port or coupling can be disposed on the second body 26 in order to connect the heating apparatus (not shown) to an external electricity source. For example, in the specific embodiment of FIG. 1B, the apparatus 8 has a male plug 34 and a female plug 36 on an outer surface of the second body 26. Alternatively, any known electrical connection or coupling can be provided to allow for connection to an external electricity source.

Figure 2:
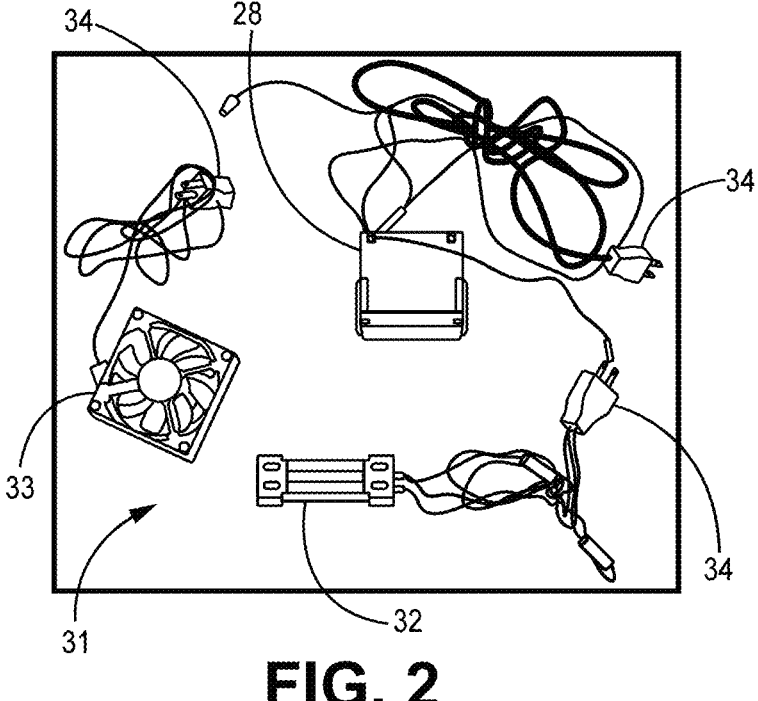
FIG. 2 is an expanded view of the elements comprising a heating module of a freeze-resistant water container, according to one embodiment.

FIG. 2 illustrates the components that may make up a heating module or apparatus 31, according to one embodiment. The heating module 31 may comprise a fan 33, a temperature control device 28, a heating element 32, and other electrical components. The temperature control device 28 can be a thermostat. These components may operate using alternating current. The fan 33, thermostat 28, and heating element 32 may each be connected to an electrical power source using male power plugs 34 connected to each component of the heating module. The thermostat 28 may be configured to identify a low temperature threshold, a high temperature threshold, or both a high and a low temperature threshold. In some embodiments, the heating element 32 is a positive temperature coefficient heating element. Alternatively, any known heating element can be used.

The thermostat 28 may recognize a range between −58° F. and 210° F. Alternatively, the thermostat 28 can be any known thermostat 28 that recognizes any standard range of temperature for such a thermostat 28. While the embodiments herein generally describe a thermostat, the temperature control device 28 can be any temperature sensor and/or temperature sensor housing. In some embodiments, the low temperature set point may be 32° F. In other embodiments, the low temperature set point may be the freezing temperature of the liquid housed within the storage container. In some applications, an external device (not pictured; e.g., a controller) can be used to determine the set points associated with the thermostat 28.

Figure 3:
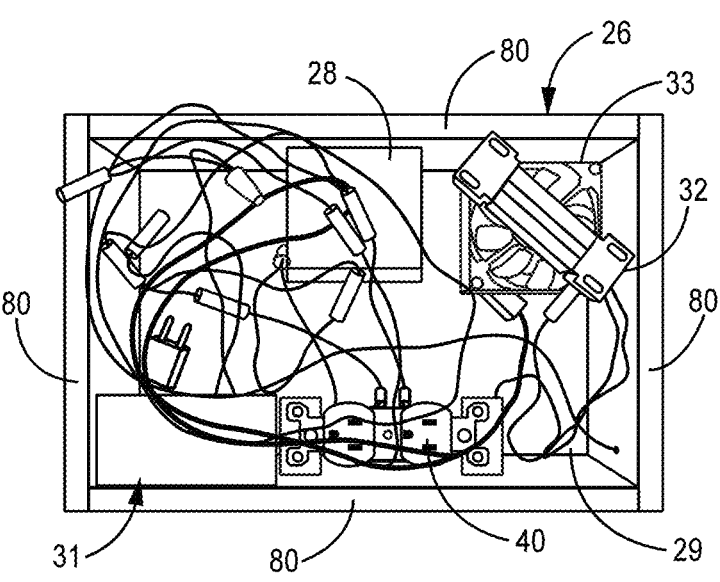
FIG. 3 is a top-down view of the second body of a freeze-resistant liquid container, according to one embodiment.

FIG. 3 illustrates one implementation of a heating module 31 disposed within a second body 26. In certain embodiments, the heating element 32 is placed adjacent to a fan 33. The fan 33 can be mounted over at least one opening (not shown) in the second body 26. This opening permits fluidic access between the first body 10 and the second body 26 such that the fan 33 can urge heated air from the interior of the second body 26 into the interior of the first body 10. A thermostat 28 may be inserted into at least one opening to measure the air temperature within the first body 10. The thermostat 28 may be inserted into the same opening as the opening in which the fan 33 is inserted, or it may be inserted into a different opening. When the thermostat 28 detects that the temperature within the first body 10 reaches a predetermined low temperature, the thermostat 28 reading can determine whether to provide electricity to the heating element 32 and/or fan 33. The heating element 32 may be mounted atop, below, or near the fan 33 such that, during operation, the fan 33 may then circulate the heated air produced by the heating element 32 through the opening in the second body 26 and into the interior cavity of the first body 10. This raises the temperature of the air above the liquid housed in the liquid container 10, preventing the surface from freezing. An electrical port 40 may be coupled to or otherwise disposed within the second body 26. In one embodiment, the electrical port 40 is a standard outlet. Alternatively, any known electrical source connection or port can be used. The means for coupling the outlet to the body may be by screw, or by other mechanical connectors. The electrical components can operate using electricity provided by connecting the heating module components to the electrical outlet 40. The heating module 31 can operate using standard electrical current. Alternatively, any known electrical current or power source can be used. The cycle of heating and cooling may continue until the ambient temperature surrounding the watering apparatus 8 is high enough to allow the internal temperature of the container to remain above the set temperature low point.

As mentioned above, the operation of the heating apparatus 31 may be dependent on the measured air temperature within the first body 10. When the temperature reaches a low set point or minimum threshold and the temperature sensors 28 register this low temperature, electricity is then supplied to the heating element 32. When electricity is supplied to the heating element 32, the heating element 32 is activated and begins to radiate heat. The heat then warms the air surrounding the heating element 32 within the second body 26. In some embodiments, the heating element 32 may reach a temperature of up to 200° F. Alternatively, the heating element 32 can be any known heating element 32 that reaches any standard temperature for such an element. As also mentioned above, electricity can also be supplied to the fan 33 to circulate air. When the heating element 32 is next to the fan 33, the fan 33 circulates the warmed air, effectively raising the air temperature in the interior cavity of the first container 10. When a high set temperature (the predetermined upper temperature threshold) is recorded by the temperature sensors 28, the sensors 28 can trigger that the electricity be cut off to the components of the heating module 31. In some embodiments, this may be a temperature of 40° F. Alternatively, the threshold temperature can be any known temperature above freezing, and can, in some embodiments, be adjustable. The change in air temperature may create a cycle of intermittent heating and cooling such that the air temperature remains a temperature above the freezing point of the liquid housed in the liquid container 10. Circulating the warmed air next to the liquid housed in the liquid container 10 can raise the surface temperature of the liquid, preventing the liquid from freezing within the container 10. This permits the liquid to remain accessible in cold temperatures.

Figure 4:
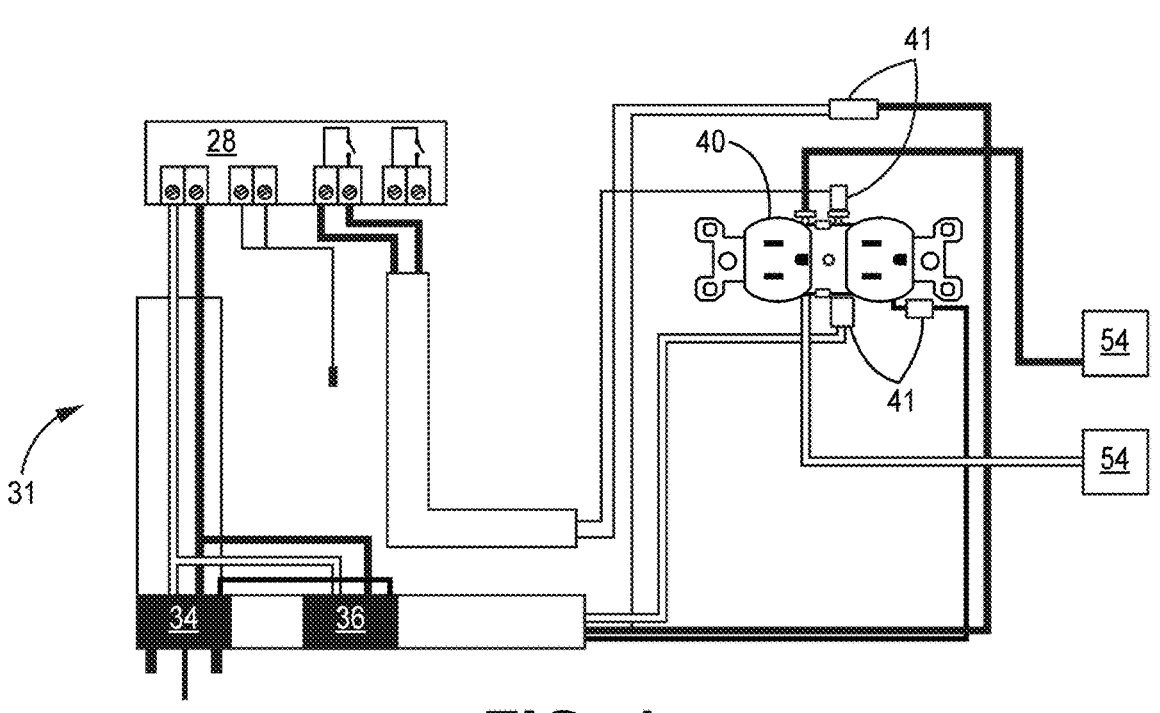
FIG. 4 is a diagram displaying the electrical configurations of the heating module of the liquid container, according to one embodiment.

FIG. 4 illustrates one embodiment of the electrical system of the heating module 31. In this embodiment, electrical connectors 41 may be connected to the outlets 40. The electrical connectors 41 may connect wires from the outlet 40 to components 34, 36 which may be connected to an outside power source. The electrical connectors may also connect various wires to one another. These may also be connected to additional sensors 28, which may be configured to recognize a temperature threshold set to a user's preferences. The temperature sensor 28 may also be connected using wiring to an outside power source. The outside power source may be connected to the heating module 31 using the female plug 36 and male plug 34 mentioned above (and depicted in FIG. 1B). As discussed above, the male plug 34 and the female plug 36 may protrude from an exterior surface of the second body. Alternatively, any electrical connection or port can be used to couple the components of the heating module 31 to an outside electrical source.

Figure 5:
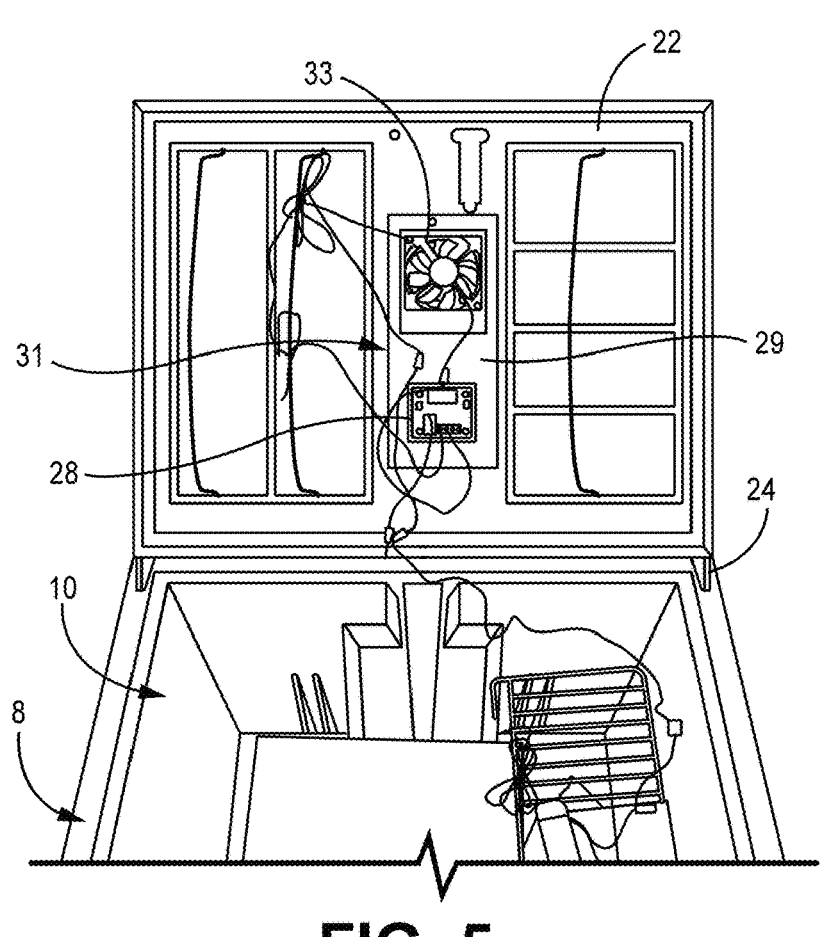
FIG. 5 is a perspective view of an alternative embodiment of a liquid container, according to one embodiment.

FIG. 5 illustrates an alternative embodiment of a watering apparatus 8. In some embodiments, the components of the heating module 31 may be attached to the interior of the first body 10, such that the components are not within a second body. That is, certain watering apparatus 8 implementations have no second body. In some embodiments, the components may be mounted to the interior surface of the lid 22. In this embodiment, the heating module 31 components may be attached to the lid 22 using a screw or any other known mechanical fastener.

Figure 6:
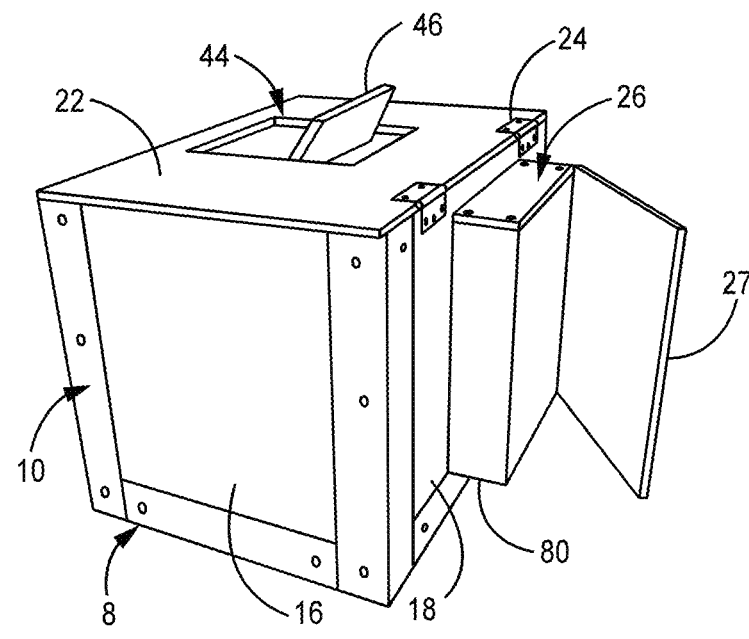
FIG. 6 is a perspective view of an alternative embodiment of the liquid container, according to one embodiment.

FIG. 6 illustrates another alternative embodiment of the watering apparatus 8. The apparatus 8 may be used as a watering trough for animals. The watering trough 8 can have a first body 10 with a base (not shown), a front (not shown), a rear 18, and two side panels 16. Except as discussed below, the various components of this apparatus 8 are substantially similar or identical to the components of the apparatus 8 depicted in FIGS. 1A-4 as described in detail above.

Figure 7:
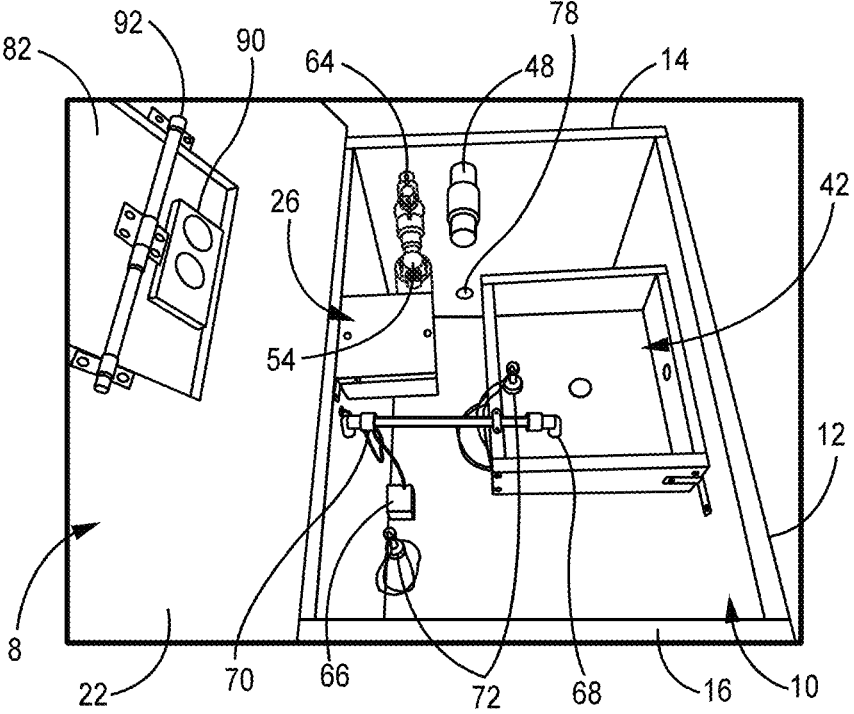
FIG. 7 is a top-down perspective view of the interior cavity of a liquid container, according to one embodiment.

In this specific implementation, the lid 22 has an access point 44. The access point 44 of the lid 22 is defined by an access panel 46, which can be pivotably attached to the lid 22. According to one embodiment, a pivot rod 92 can be attached to the side of the access panel 46 facing the interior of the lid 22. The access panel 46 may rotate around the pivot rod 92 between an open position (as shown in FIG. 6) and a closed position (as shown in FIG. 7). This configuration permits an animal to approach the watering trough 8, apply pressure to the access panel 46, and press the panel 46 into the liquid container 10 such that the panel 46 pivots about the pivot access point 44, creating an opening 44 and defining the access panel open position. The animal may then use this opening 44 to access the liquid housed within the liquid container 10. A weight 90 may be attached to the bottom surface 82 of the pivotably attached panel 46. When an animal ceases to apply pressure to the panel 46, the force of the weight 90 forces the rear end of the panel 46 to return to its closed position, closing the access panel 46 within the lid. Alternatively, the access panel 46 can be pivotally attached to the lid 22 via any known mechanism or component and can be urged back to its closed position via any known mechanism or component.

FIG. 7 illustrates an alternative embodiment of the watering assembly 8. In this specific implementation, the liquid container 10 contains an elevated drinking bowl 42. The elevated drinking bowl 42 may receive water from a pump 66 attached to pump tubing 68 or a garden hose attached to an inlet of the watering container 10. The drinking bowl 42 may be filled automatically using a variety of sensors 72. For example, the liquid container 10 may regulate its water level using a water level sensor 72. In some embodiments, the water level sensor 72 may be a float arm or float switch. Alternatively, any known sensor or mechanism can be used to deliver an appropriate amount of water to the elevated bowl 42.

The sensor 72 may indicate when electricity should or should not be supplied to the electrical components of the pump 66 within the liquid container 10. In other embodiments, the sensor 72 may indicate when the pump 66 should supply more liquid to the bowl 42. When the sensor 72 recognizes that the water level has been reduced to below a predetermined threshold, the sensor 72 may be triggered to cause electricity to be supplied to the water pump 66. The pump 66 will then supply additional water to the elevated bowl 42, until the threshold water level programmed to be recognized by the sensor 72 is met.

Figure 8:
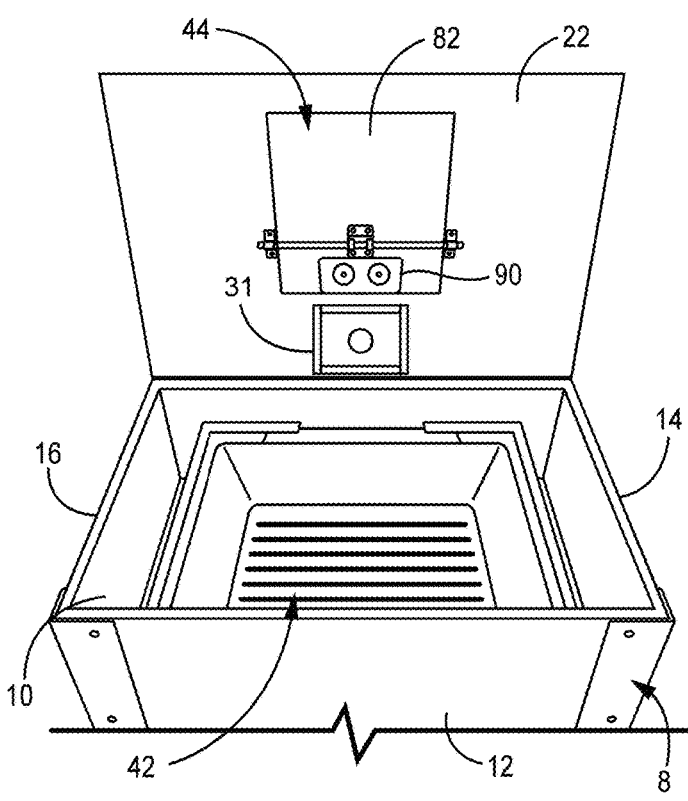
FIG. 8 is a top-down perspective view of the interior cavity of a liquid container, according to one embodiment.

FIG. 8 illustrates a further alternative embodiment of a watering apparatus 8 with a removable drinking bowl 42. The liquid container 10 may fill with residue such as sand, dirt, or other debris. The residue may enter the liquid container 10 and drinking bowl 42 through the pivoting drink access point 44 within the lid 22. In this embodiment, the drinking bowl 42 may be removable to allow for easily clearing out the debris from the drinking bowl 42. After the drinking bowl 42 has been cleaned, the drinking bowl 42 may be replaced within the liquid container 10. The drinking bowl 42 may be attached to the liquid container 10 by known fasteners, or it may be nested within an internal structure, or by other means. The drinking bowl 42 may be formed by multiple pieces, assembled together. In other embodiments, the drinking bowl 42 may be molded into the interior of the container 10 and cannot be removed. In different embodiments, the drinking bowl 42 may be pivotably attached to the interior of the container 10. When the drinking bowl 42 is pivotably attached to the interior of the container 10, the bowl 42 may pivot upwards. Other embodiments may incorporate bowls 42 or drinking wells into the liquid container 10. In this embodiment, the fan 33 may be mounted to the interior of the lid 22 behind the access point 44.

As discussed above (and returning now to FIG. 7), in some embodiments, the level of the water within the container 10 may be controlled using a float sensor 72. The float sensor 72 can be connected to a submersible water pump 66. The float sensor 72 can control whether the pump 66 is on or off. The water pump 66 in this embodiment is located in a lower portion of the container 10 and connected to a first end of water pump tubing 68. The water pump tubing 68 can have two ends. The second end may terminate in an outlet in the upper portion of the bowl 42. A one-way overflow valve 54 may be installed in an upper portion of the container, preventing water from over filling container 10. The float sensor 72 may stop the flow of electricity to the pump 66 in the event that the water in the container is low and no additional water can be added to the container.

As shown in FIG. 7, the container 10 can contain a drain plug 78 to prevent the release of liquid from the liquid container 10 and further to allow for removal of the plug 78 when it is desired to allow liquid to be drained from the container 10. The drain plug 78 is located in the bottom of the container 10. Alternatively, the plug 78 can be located on the lower part of one of the walls. The water inlet 48 may be included in the container 10 as well.

Figures 9A, 9B:
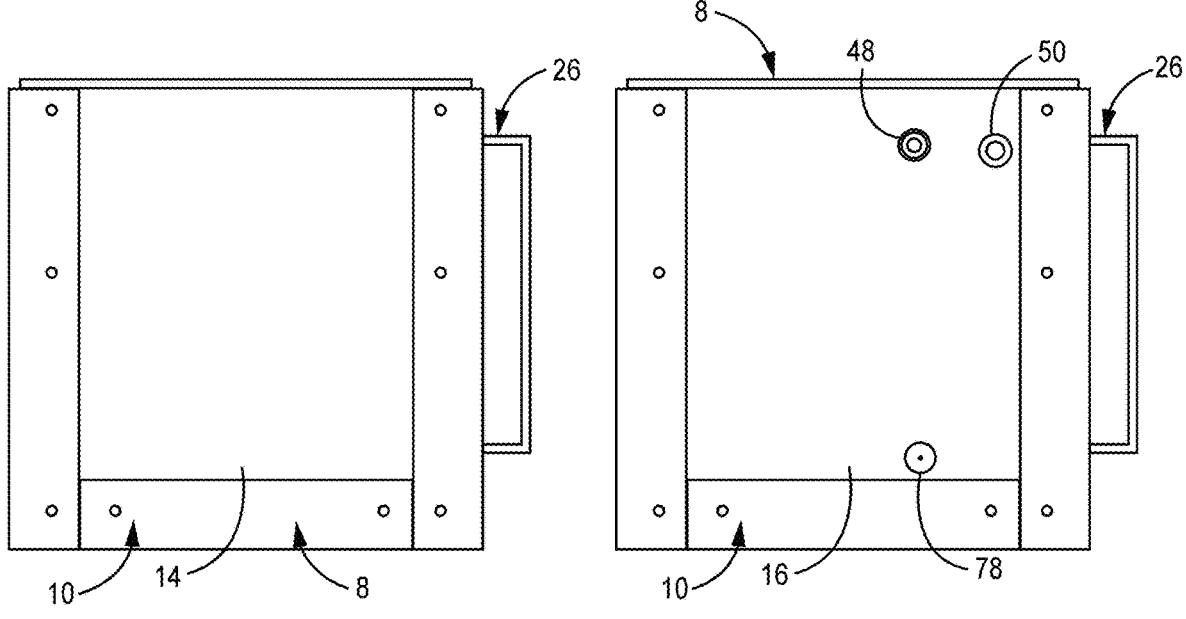
FIGS. 9A and 9B is a side view of a first body of a liquid container, according to one embodiment.
Figure 9C:
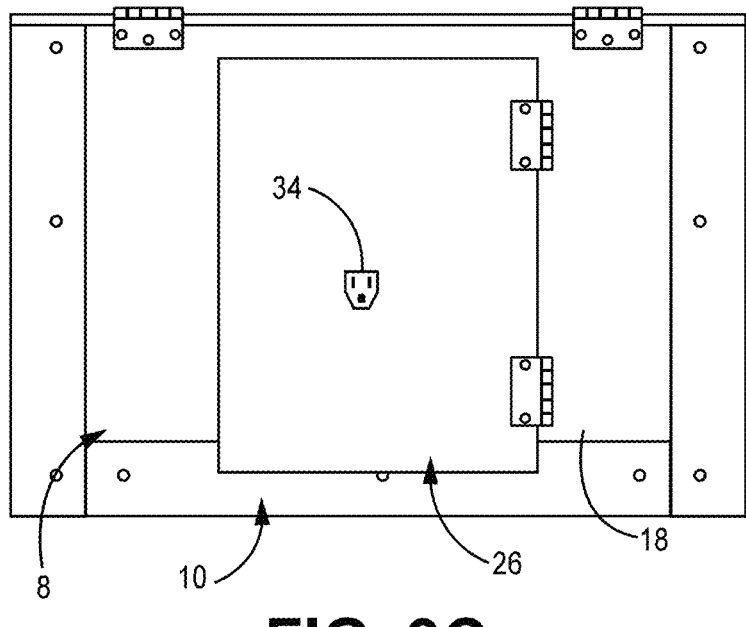
FIG. 9C is a rear view of a first and second body of a liquid container, according to one embodiment.

FIG. 9A, FIG. 9B, and FIG. 9C each depict side views of a liquid container 10 according to a further implementation. More specifically, FIGS. 9A and 9B depict side panels 14 of the liquid container 10. The side panel 14 of FIG. 9B depicts an embodiment wherein the side panel 14 comprises access points for components of the liquid container 10. For example, the side panel 14 may comprise access points for tubing 48, a water inlet 50, and a drain plug 78. FIG. 9C depicts a rear panel 18 of the liquid container 10. The rear panel 18 is coupled with a second body 26 housing a heating module (not shown). In other words, the second body 26 is attached to the rear panel 18 in this embodiment. The second body 26 may have a male plug 34 to provide electrical access to the heating module. An extension cord may be attached to the male plug 34 of the rear panel 26 to provide electricity. Alternatively, the second body 26 can have any known electrical connection or port to be coupled to an external electrical source. The surface of the second body 26 comprising the male plug 34 may be hingedly attached to the second body 26. It may also be latched, attached using a mechanical fastener, or another attachment method may be used. Additionally or alternatively, the second body can house additional electrical components and/or wiring, and the heating module can be disposed elsewhere on and/or in the liquid container.

In alternative embodiments, the second body 26 may be coupled to any one of the sides, front, or lid of the container 10. In further alternatives, the second body 26 may be coupled to a surface within the liquid container 10. The components within the second body 26 may also be coupled to an interior surface of the liquid container 10 or the lid 22.

In some specific exemplary embodiments, any of the watering apparatus 8 embodiments herein can utilize a 14 watt fan 33, a 100 watt positive temperature coefficient heating element 32, and a temperature control device 28 rated at 3 watts. Alternatively, any known fan, heating element, and/or temperature control device for use in animal watering devices can be used in any of the implementations herein. In one embodiment, the volume of the container 10 is 150 gallons. Alternatively, the container 10 of any embodiment herein can have any known or desired volume. In certain implementations, the heating module 31 only heats the surface above the water in the drinking bowl 42 (or in the container 10 when there is no drinking bow), rather than all 150 gallons of water in the container 10.

Figure 10:
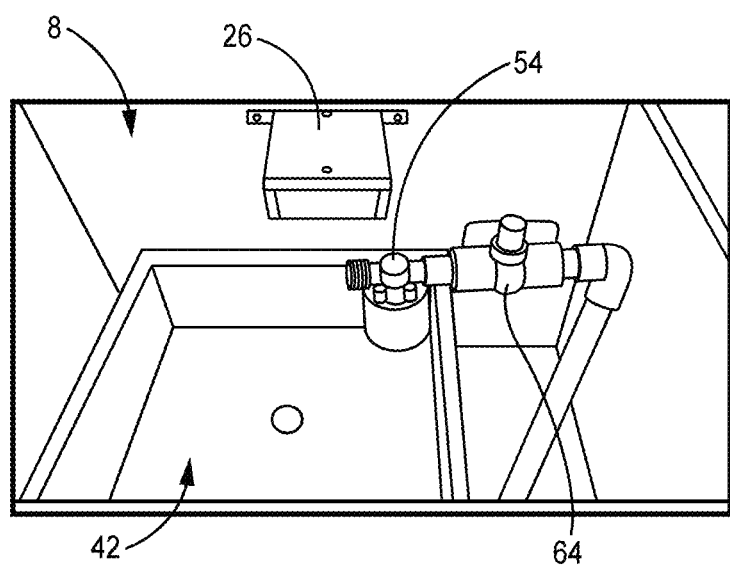
FIG. 10 is a perspective view of an alternative embodiment of the liquid container, according to one embodiment.

FIG. 10 illustrates an alternative embodiment of the liquid container 10 not including a water pump In these embodiments, a water control valve 54 can be installed within the drinking bowl 42 and connected to an incoming water line with a shut off valve 64. Such a configuration can be incorporated into any of the watering apparatus embodiments disclosed or contemplated herein. In this embodiment, the lower portion of the container 10 is not used to hold water. That is, only the bowl 42 contains water.

Alternatively, any of the embodiments herein may be powered by solar energy and thus may be attached to a photovoltaic energy source. This energy source may contain a solar panel and solar charge controller. The solar charge controller can be connected to at least one battery providing electrical power. If a photovoltaic energy source is used, the components of the heating module may require direct current.

Figure 11:
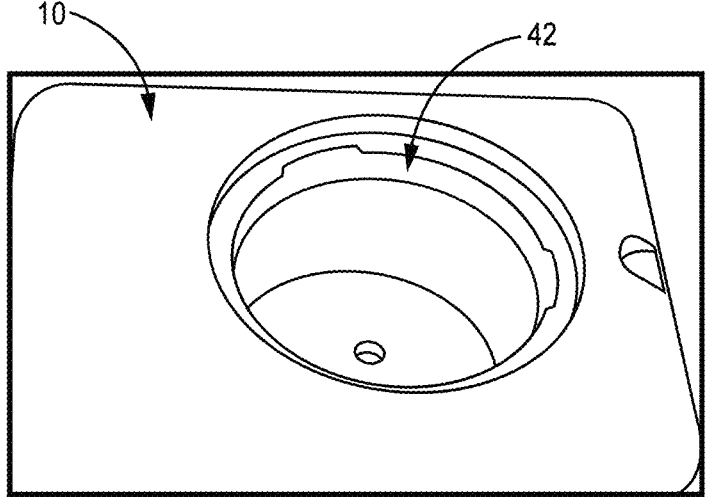
FIG. 11 is a perspective view of a first body of a liquid container, according to a further embodiment.
Figure 12:
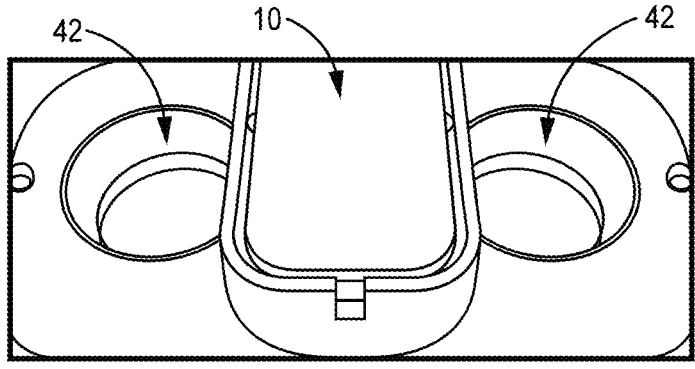
FIG. 12 is a perspective view of a first body of a liquid container, according to a further embodiment.

FIGS. 11 and 12 each depict different watering trough embodiments wherein a second body comprising a heating module may be attached. FIG. 11 depicts a watering trough 10 with one access point 42 providing drinking access for an animal. FIG. 12 depicts a watering trough 10 with two access points 42 providing drinking access for two animals to use the trough 10 at the same time. FIG. 11 and FIG. 12 are both exemplary depictions of different types of troughs and access points which a heating module may be coupled with. If there is more than one access point 42, then there may be more than one location where the water may freeze in a container. If there is more than one location where the water may freeze, the liquid container 10 may have more than one heating module. The additional heating modules may be in additional second bodies coupled to the first body. The heating modules may be coupled in any area that permits fluidic access between the first body and the additional body housing the heating module. According to certain implementations, such a watering apparatus can have two, three, four, five, six, or more heating modules, each of which can disposed within a separate second body (such that there is the same number of second bodies as heating modules) or can have no second bodies.

FIG. 13 depicts another alternative embodiment of a watering apparatus 8. The liquid container 10 in this particular apparatus 8 may comprise a tote 10. The tote 10 may have an opening (not shown) providing access to the interior of the tote 10. The opening can be covered with a cap 62. The cap 62 may be screwed into the opening (not shown). In some embodiments, the cap 62 may snap into place over the opening structure (not shown). Alternatively, the cap 62 may be attached using any other known means. In alternate embodiments, the liquid container 10 can be an intermediate bulk container 10. The container 10 may be molded to a shape. The shape of the container 10 may be round, square, or other shapes.

FIGS. 14A and 14B depict opposing sides of a second body 26, according to a further implementation. The second body 26 may be a cap 26 that attaches to a first body 10 (not shown). The first body 10 can be any of the first body 10 embodiments disclosed or contemplated herein. The cap 26 may have an inner surface 63, which faces the interior of the body 10 to which the cap 26 is attached. The cap 26 may also have an exterior surface 62. Components of the heating module 31 may be mounted or attached to both the interior and exterior surface 63, 62 of the cap 26. The cap 26 may comprise a cap wall 65 The exterior surface of the wall may be smooth or have ridges. The interior surface of the wall may have grooves that can be fitted over an opening structure, fastening the cap 26 to the first body 10.

As shown in FIG. 14B, the interior surface of the cap 26 may comprise the fan 33 and/or additional temperature sensors 39. The fan 33 may be attached to the interior surface of the cap 26 by screws, mechanical fasteners, or any other known fastening means. A thermostat 28 may be housed within the cap 26.

As shown in FIG. 14A, the exterior of the cap 26 may comprise a power button 37, a temperature probe 39, or additional components. The fasteners attaching the fan 33 to the inside of the cap 26 may protrude on the exterior surface of the cap 26. These fasteners may be, for example, screws, or any other known mechanical fasteners.

Figure 15A:
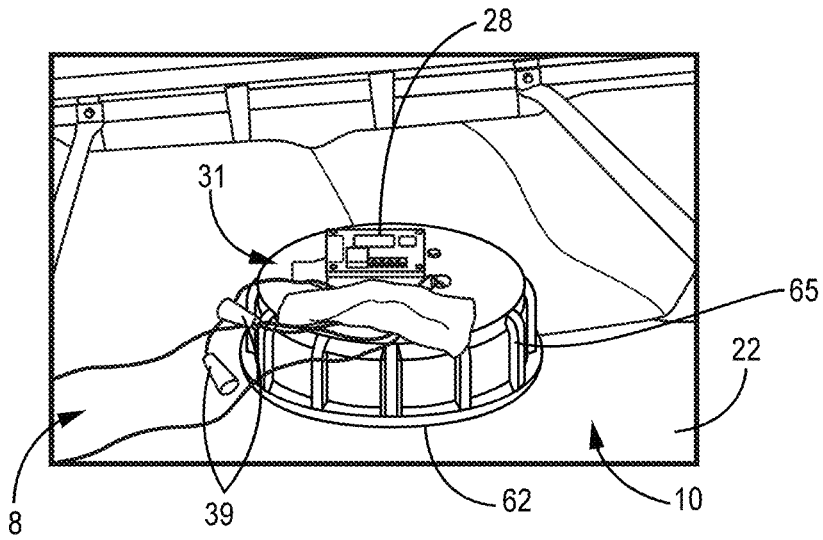
FIG. 15A and FIG. 15B are close-up perspective views of a liquid container, according to a further embodiment.
Figure 15B:
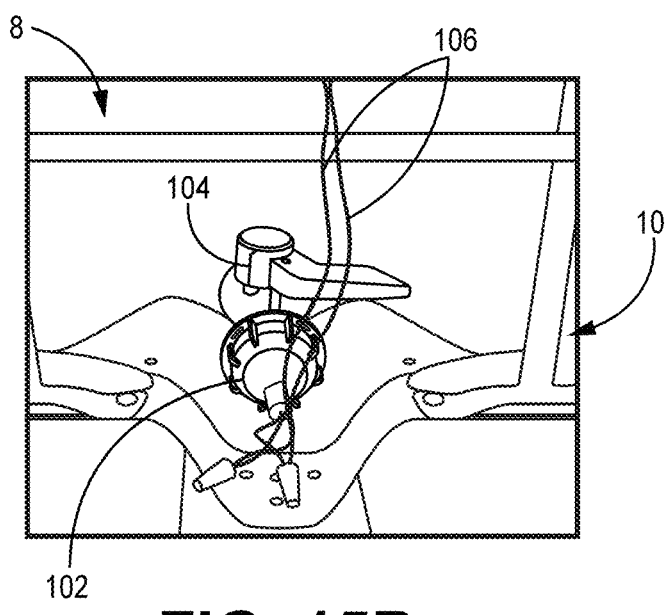

FIGS. 15A and 15B illustrate a cap 26 and heating module (not shown) on a different type of container 10. The container 10 may be insulated. As shown in FIG. 15A, the temperature sensor 28 may be attached to the exterior surface of the cap 26. The cap 26 may cover an opening (not shown) in the body of the liquid container 10 wherein the opening provides access such that liquid may be added to the container 10. A temperature probe 39 may be attached to a heating element 32 configured to regulate the temperature of a separate freeze point.

As shown in FIG. 15B, the liquid container 10 may comprise a spigot 104. The spigot 104 may be used to dispense liquid from the liquid container 10 into another container, for example, a bowl or bottle. Under freezing temperatures, the liquid may freeze around the spigot 104 location in the container 10, reducing a user's ability to retrieve liquid from the liquid container 10. The liquid container 10 may comprise wiring and temperature sensors 106 calibrated to recognize freezing temperatures at the spigot 104 location. The heating module may comprise a halogen bulb 102. The halogen bulb 102 may provide heat to the spigot location 104, increasing the temperature and reducing the risk of water freezing at the spigot location 104. The halogen bulb 102 may receive electricity when the temperature sensor 106 registers a low temperature point. A cycle of heating and cooling may be employed to prevent water from freezing at the spigot location 104.

Figure 16:
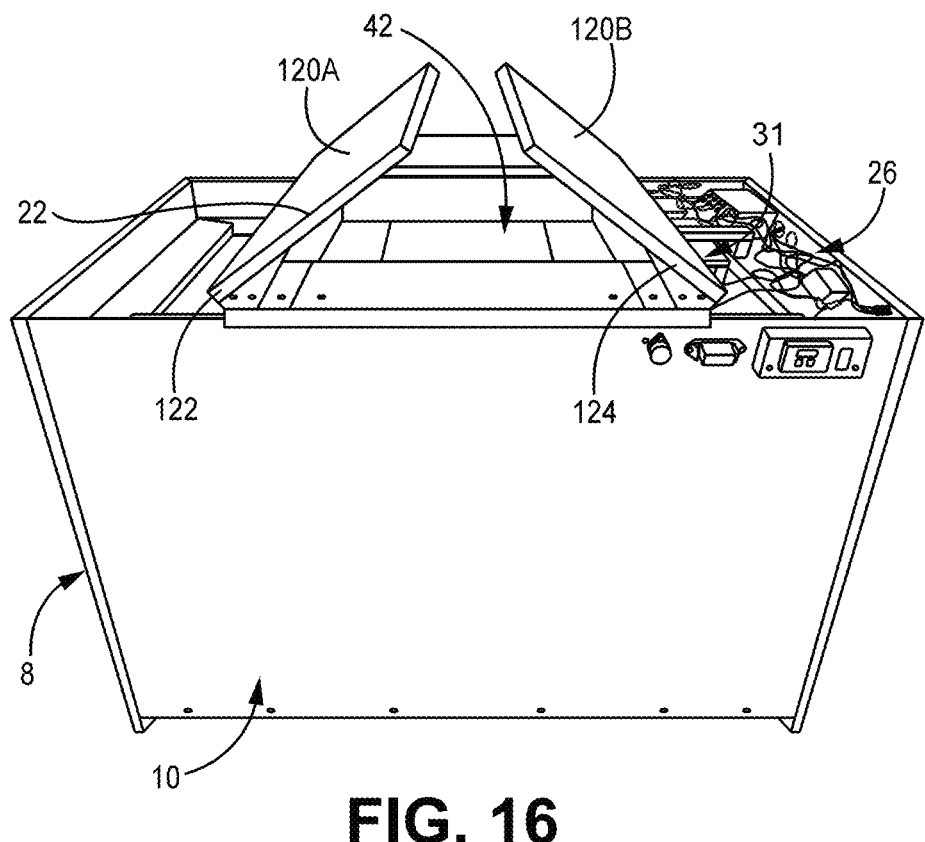
FIG. 16 is a perspective view of a liquid container, according to a further embodiment.

FIG. 16 illustrates a further alternative embodiment of the watering apparatus 8. In this embodiment, a drinking access point 42 is located within the lid 22 of the container 10. The lid 22 contains panels 120A, 120B pivoting about pivot points 122, 124. The lid panels may pivot about a left pivot point 122 and a right pivot point 124. The left panel 120 may provide access to the interior of the liquid container 10. The right panel 120B may provide access to the heating module of the liquid container 10.

Figure 17:
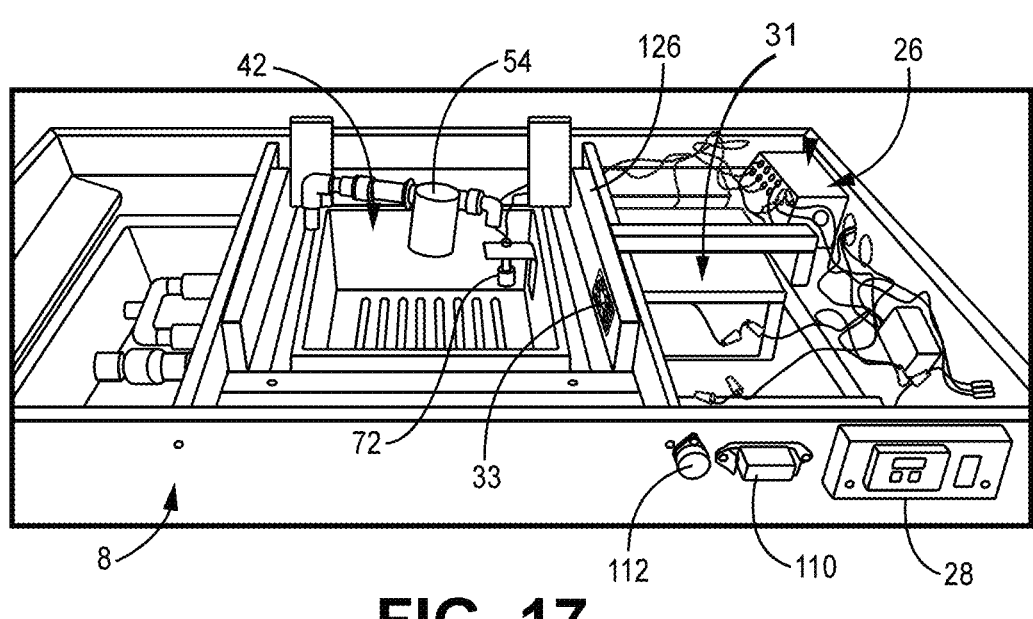
FIG. 17 is a close-up perspective view of a liquid container of FIG. 16 without a lid.

FIG. 17 illustrates the liquid container 10 of FIG. 16 without the lid 22. In this embodiment, the liquid access point 44 is disposed in the center of the bowl 42. A sensor 72 may be used to measure the water level. A water level control valve 54 may be used to measure the level of the water within the bowl 42.

To a side of the bowl 42 may be a panel 126 separating the bowl from the electrical components of the temperature regulation module 26 of the liquid container 10. Within that panel 126 may be an opening wherein the fan 33 of the temperature regulation module is placed. The wiring for the electrical components may be on the side of the panel opposite that of the bowl 42. The temperature control device 28 may protrude from the liquid container 10 such that it can be seen from the outside of the container 10.

In some embodiments, any of the watering apparatus implementations disclosed or contemplated herein can have additional components to alert a user that the water level is low. As shown, for example, in FIG. 17, these additional components may provide an auditory cue 112 or visual cue 110 that the water is low. An auditory cue may be, for example, buzzing or beeping. A visual cue may be, for example, a blinking light.

The following examples and any limitations included therein may be used in combination and/or eliminated with any of the embodiments described herein without deviating from the full scope of the disclosure.

Example 1

Figure 18:
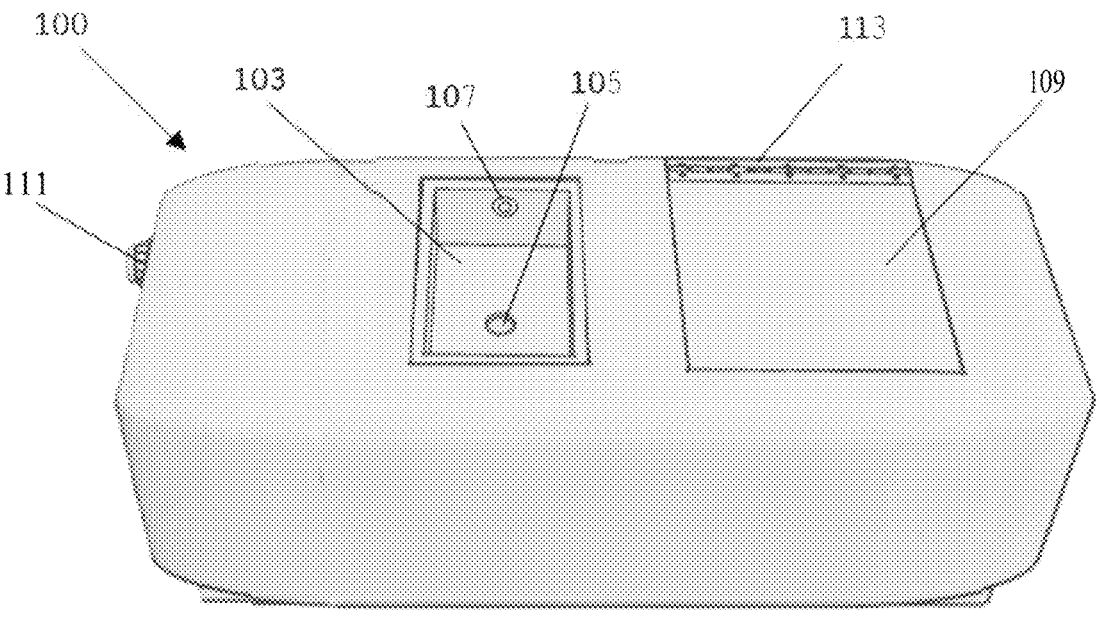
FIG. 18 is a perspective view of an example of a temperature regulated liquid container, according to one embodiment.

FIG. 18 is a perspective view of a liquid container 100 according to an embodiment of the present invention. In this non-limiting example, the body of container 100 comprises a watering bowl 103, including a water inlet opening 105 and a water discharge opening 107. Watering bowl 103 allows animals access to a regulated volume of drinking water. Watering bowl 103 may be molded within the body of container 100 or a separate, releasably coupled element. Container 100 further comprises an access panel 109, pivotably coupled by a hinge 113, and a one-way overflow check valve 111. Panel 109 allows access to the interior cavity of container 100, and may be releasably attached or pivotably coupled to container 100. In the event the interior cavity of container 100 is overfilled with water, or another liquid, check valve 111 contains a mechanism activated by liquid pressure, permitting liquid flow in only one direction, thus allowing for excess liquid to exit the interior cavity. The exterior body of container 100 may be manufactured by rotational molding or some other method to produce a hollow interior cavity.

Figure 19:
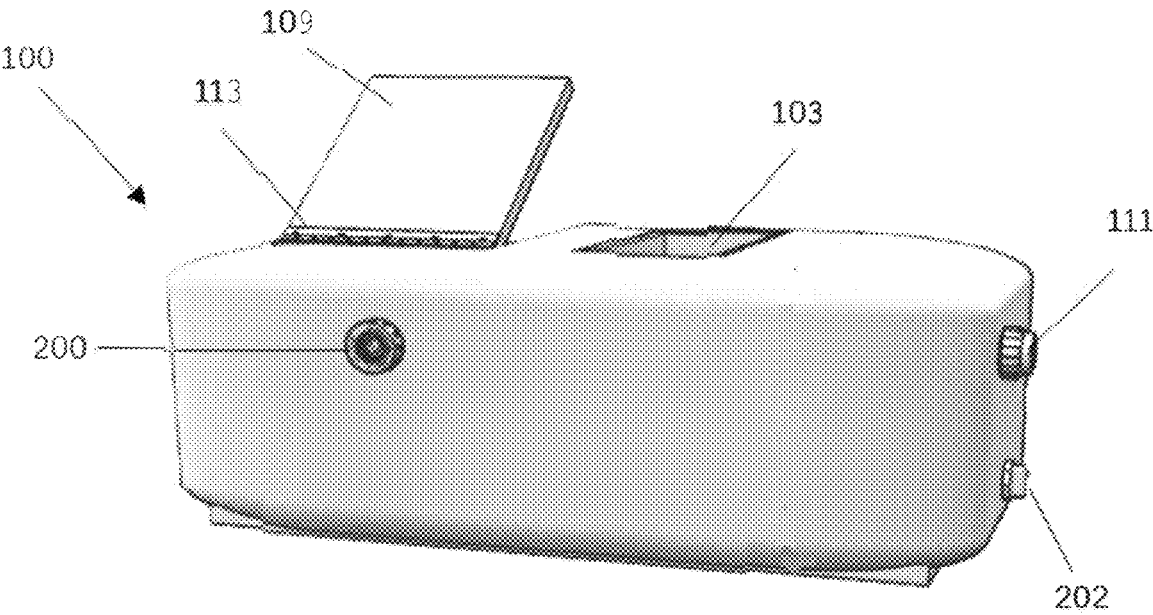
FIG. 19 is a perspective view of an example of a temperature regulated liquid container, according to one embodiment.

FIG. 19 is a perspective rear view of the temperature regulated liquid container 100 of FIG. 18. In this example, the exterior body of container 100 further comprises a garden hose attachment 200 for connection to an external source of water supply (not pictured) and a drain plug 202. Attachment 200 enables the water supply to fill the interior cavity of container 100. Plug 202 is releasably coupled to the exterior body of container 100 and may be removed, allowing water to exit the interior cavity for draining purposes.

Figure 20:
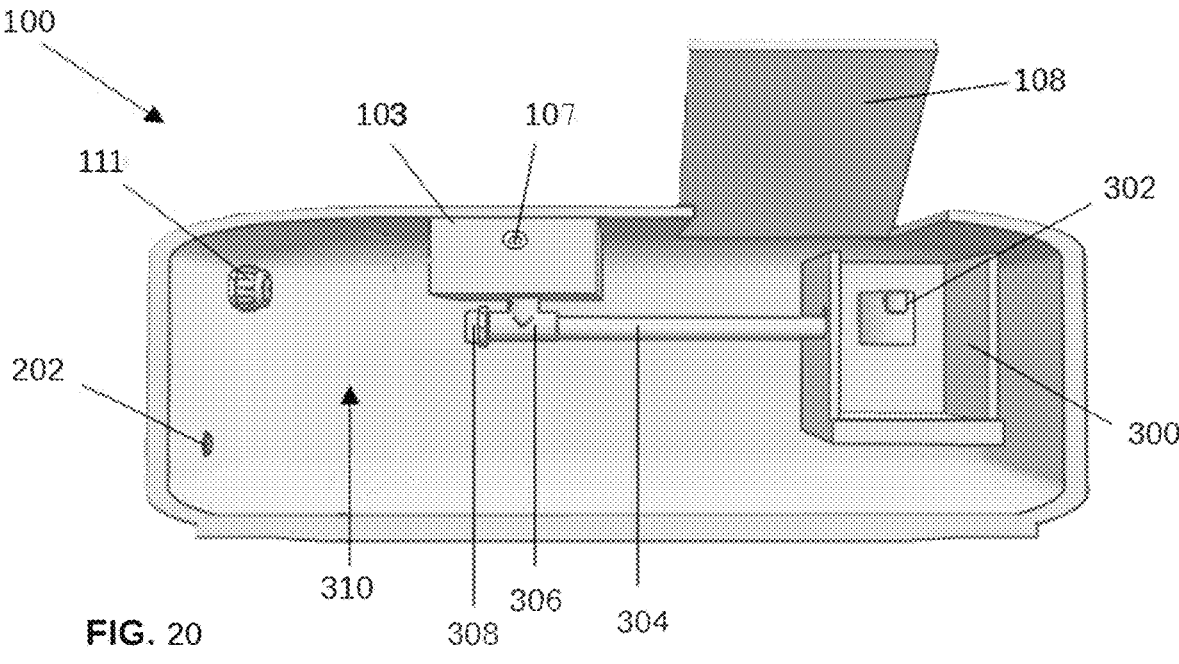
FIG. 20 is a perspective front cutaway view of a temperature regulated liquid container of FIG. 19, according to one embodiment.

FIG. 20 is a perspective, cutaway frontal view of the temperature regulated liquid container 100 of FIG. 18, exposing an interior cavity 310 and the internal plumbing components of the liquid container 100. Panel 109 allows access into this interior cavity 310. In this example, cavity 310 houses a master water level container 300, an automatic water level control valve 302, a water tube 304, a water outlet connector 306 and a water tube end cap 308. Valve 302 is disposed within the master water level container 300 at a location defining the maximum permitted water high water level within the master water level container 300. Valve 302 contains an internal float mechanism for opening and closing a water inlet when its base becomes submerged in water. When a water supply hose, or other source supplying liquid is connected to attachment 200, incoming water is routed through valve 302 into master water level container 300.

In some applications, incoming water will rise until it contacts the base of valve 302 at the maximum permitted high water level threshold. When this occurs, valve 302 shuts off the water supply. Due to the principle of hydrostatic paradox, water rises at the same rate within watering bowl 103 and master water level container 300 and both are filled at the same time.

The water level in watering bowl 103 is regulated according to the water level within master water level container 300. Water is transferred into watering bowl 103 through inlet 105, coupled to connector 306 via distribution tube 304 connected to master water level container 300. When an animal drinks from the watering bowl, this action causes the water level within the master water level container 300 to drop below the maximum permitted high water level. Valve 302 compensates for this loss of water by allowing additional water to flow into the master water level container 300. Water is continually replenished within master water level container 300 and the watering bowl 103 during the period the animal is drinking. This arrangement permits master water level container 300 to maintain its predetermined and consistent water level as well as the water level within watering bowl 103. This water metering process limits the volume of water exposed to possible contamination. The enclosed body of container 100 protects the larger volume of water within cavity 310 from environmental factors, including algae, mosquitoes and airborne debris.

Tube 304 is rigid in this embodiment, but may be replaced with a flexible hose, or a roto molded watering channel connecting both watering bowl 103 and master water level container 300. Cap 308 is releasably coupled to connector

306 and may be removed if tube 304 needs to be flushed of debris. Attachment 200, shown in FIG. 2, and valve 300 are releasably coupled together.

A float valve may be substituted for valve 302 for defining the maximum permitted high water level within master water level container 300. In this embodiment, container 100 serves as a protective housing for the internal plumbing components. In the event of valve 302 failing in shutting off the water supply, container 100 acts a reservoir, conserving a considerable amount of water, as water will exit watering bowl 103 by way of opening 107, eventually allowing excess water to exit the cavity by way of check valve 111. In this example, the empty space within cavity 310 may also be utilized as a storage medium.

Figure 21:
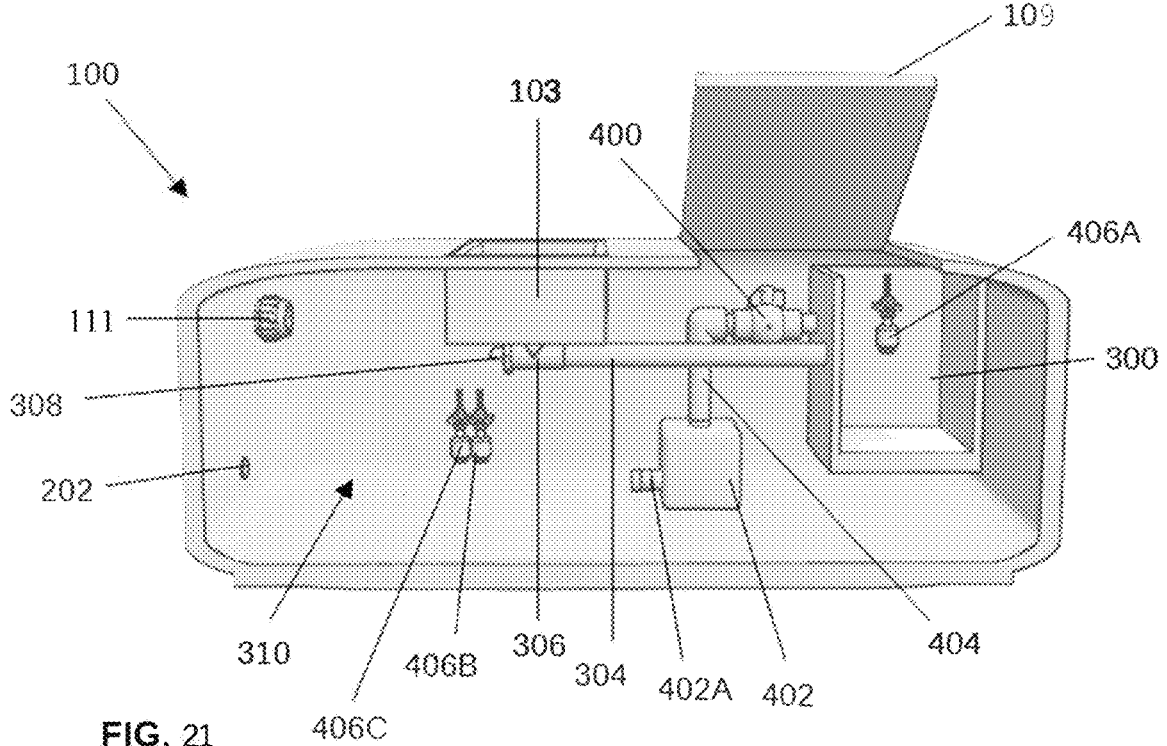
FIG. 21 is a perspective front cutaway view of a temperature regulated liquid container of FIG. 19, according to another embodiment.

FIG. 21 is a perspective cutaway view of container 100, illustrating the internal plumbing components within cavity 310. A water pump 402, a water pump inlet tube 402A, a water pump discharge tube 404 and a plurality of float switches 406A, 406B and 406C are disclosed. In this example, container 100 would be manually filled with water, as opposed to being connected to a water source via attachment 200 and valve 302. In this example, container 100 would need an external AC or DC electrical connection (not shown), for powering water pump 402 and float switches 406A, 406B and 406C. Water is manually introduced into cavity 310 through panel 109, to a maximum predetermined level below check valve 111. In this illustration, the front wall of master water level container 300 is cutaway. Float switch 406A is disposed within master water level container 300 at a location defining the maximum permitted high water level within master water level container 300. Switch 406A performs as a power on/off switch for pump 402, based on the water level within master water level container 300. Switch 406A is electrically connected to pump 402. When switch 406A is activated, based on a low water level within master water level container 300, an electrical connection is completed, supplying an electrical current to pump 402. When switch 406A is deactivated based on a high water level, the electrical connection is interrupted, disconnecting power to pump 402.

At first use, cavity 310 is empty. Cavity 310 is filled with water, and external power to container 100 is turned on. Due to the low water level in master water level container 300, switch 406A completes the electrical connection providing power to pump 402. Pump 402 transfers water from cavity 310 through intake tube 402A into master water level container 300 via discharge tube 404. When incoming water rises until the maximum permitted high water level threshold is met within master water level container 300, switch 406A is activated and triggers power shut off to pump 402. Due to the principle of hydrostatic paradox, water rises at the same rate within watering bowl 103 and master water level container 300 and both are filled at the same time. The water level in watering bowl 103 is regulated according to the water level within master water level container 300.

Water is transferred into watering bowl 103 through inlet 105, coupled to connector 306 via tube 304 connected to master water level container 300. When an animal drinks from the watering bowl, this action causes the water level within master water level container 300 to drop below the maximum permitted high water level. Switch 406A compensates for this loss of water by completing the electrical connection to pump 402, allowing additional water to be pumped into master water level container 300. Water is continually replenished within master water level container 300 and watering bowl 103 during the period the animal is drinking. This arrangement permits master water level container 300 to maintain its predetermined and consistent water level as well as the water level within watering bowl 103. This water metering process limits the volume of water exposed to contamination. The enclosed body of container 100 protects the larger volume of water within cavity 310 from environmental factors, including algae, mosquitoes and airborne debris. A float valve may be substituted for switch 406A for defining the maximum permitted high water level within master water level container 300.

Additional switches 406B and 406C, are positioned in a lower portion of cavity 310. Switches 406B and 406C are installed at a location defining the maximum permitted low water level within cavity 310. According to this embodiment, switch 406B is electrically connected to pump 402 and switch 406C is connected to switch 406B and an audible buzzer 712. When a low water level exists in the lower portion of cavity 310, switch 406B triggers power shut off to pump 402 preventing pump 402 running dry, while switch 406C, simultaneously triggers power to low water buzzer 712. (buzzer 712 shown in FIG. 31). When cavity 310 is refilled with water, switch 406B restores power to pump 402 and switch 406C simultaneously cuts power to buzzer 712.

In situations requiring cavity 310 to be emptied, for maintenance or cleaning, the unused volume of water may be reclaimed to conserve water. A 3-way ball valve 400 is coupled to attachment 200, as described in FIG. 19, between discharge tube 404 and master water level container 300. An internal mechanism within ball valve 400 allows water to be diverted in alternate directions. In use, ball valve 400 allows water flow between pump 402 and master water level container 300. To empty cavity 310 of water, ball valve 400 may be actuated to close off this normal flow of water and divert it through attachment 200 to the exterior of container 100. A garden hose (not pictured) or other means of capturing the outflow may be employed.

Figure 22:
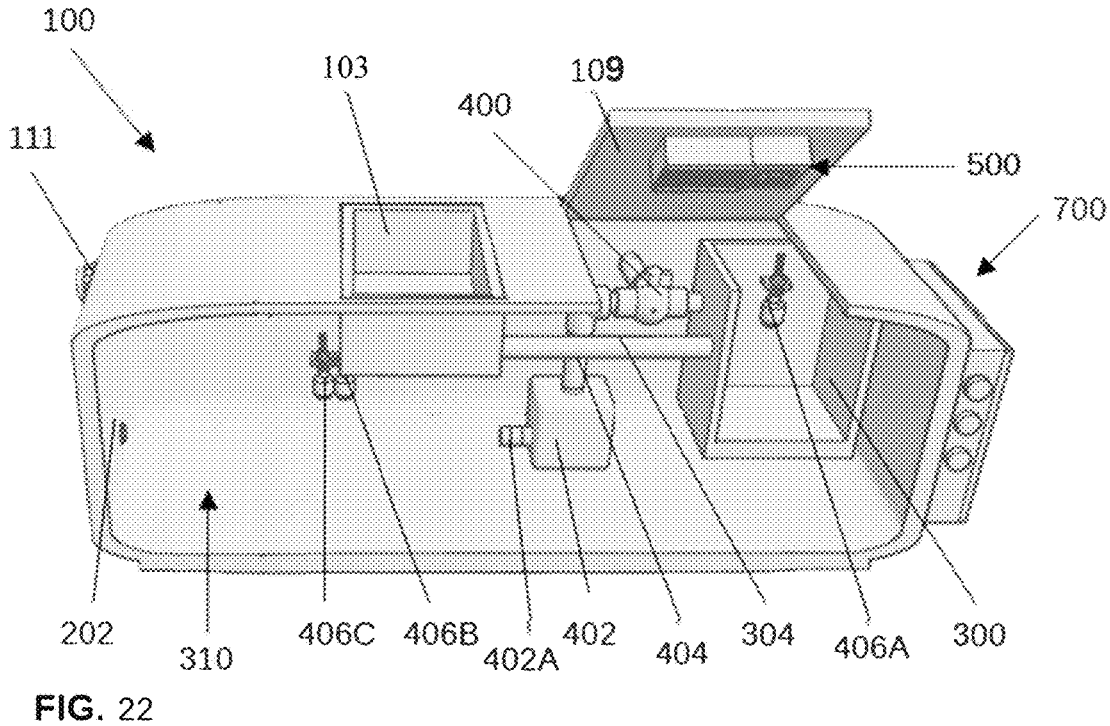
FIG. 22 is a perspective front cutaway view of a temperature regulated liquid container of FIG. 19, according to another embodiment.

FIG. 22 is a perspective cutaway view of a further alternative embodiment of container 100 as discussed above. In this example, a heating module 500 and an electrical control module 700 have been incorporated. Heating module 500 is coupled to the underside, or interior facing portion of panel 109. Heating module 500 may be positioned in an alternate location within cavity 310. Control module 700 is coupled to an exterior portion of the body of container 100. An external AC or DC electrical supply is required.

Figure 23:
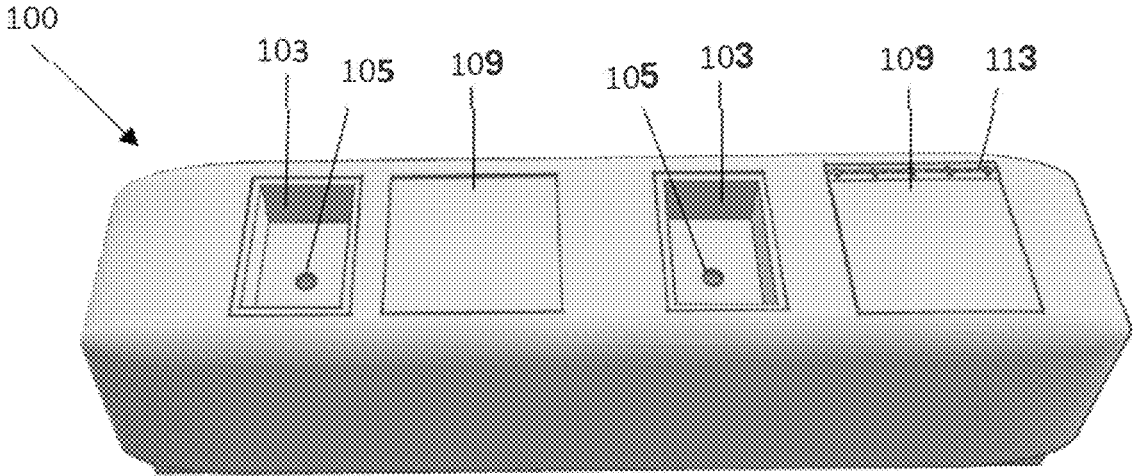
FIG. 23 is a perspective view of an alternative embodiment of a temperature regulated liquid container.

FIG. 23 is a perspective view of an alternative embodiment of container 100 as shown in FIG. 18 and discussed elsewhere herein. In this example, container 100 comprises a plurality of water bowls 103 and access panels 109. This expanded version offers the flexibility for containing a larger volume of water capable of watering multiple animals simultaneously.

Figure 24:
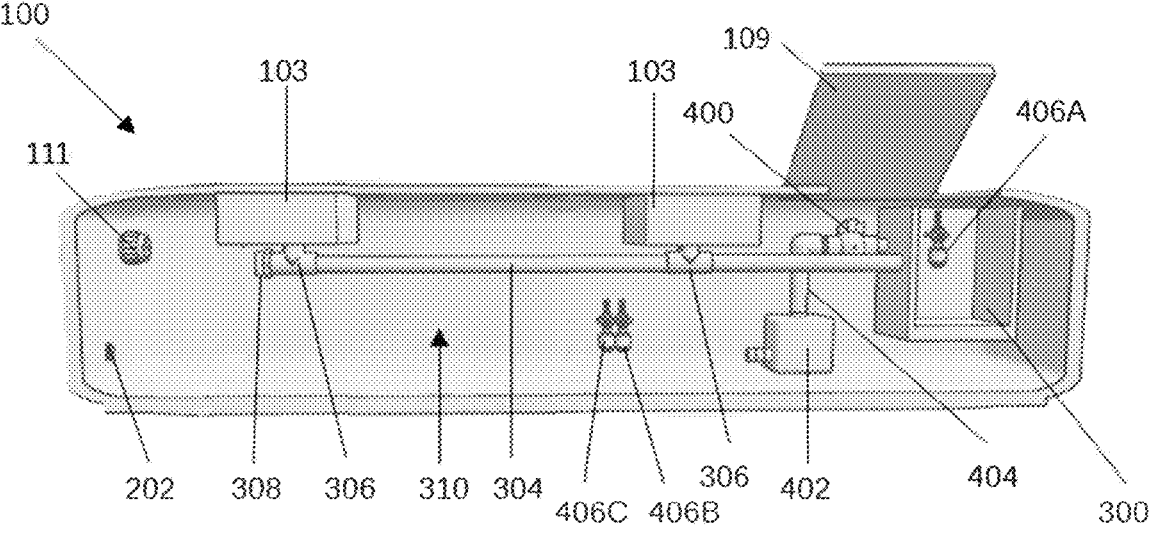
FIG. 24 is a perspective front cutaway view of a temperature regulated liquid container along line B-B of FIG. 23, according to one embodiment.

FIG. 24 is a perspective cutaway view of the liquid container as depicted in FIG. 23, illustrating the internal plumbing components of container 100 and discussed with respect to FIG. 21.

Figure 25:
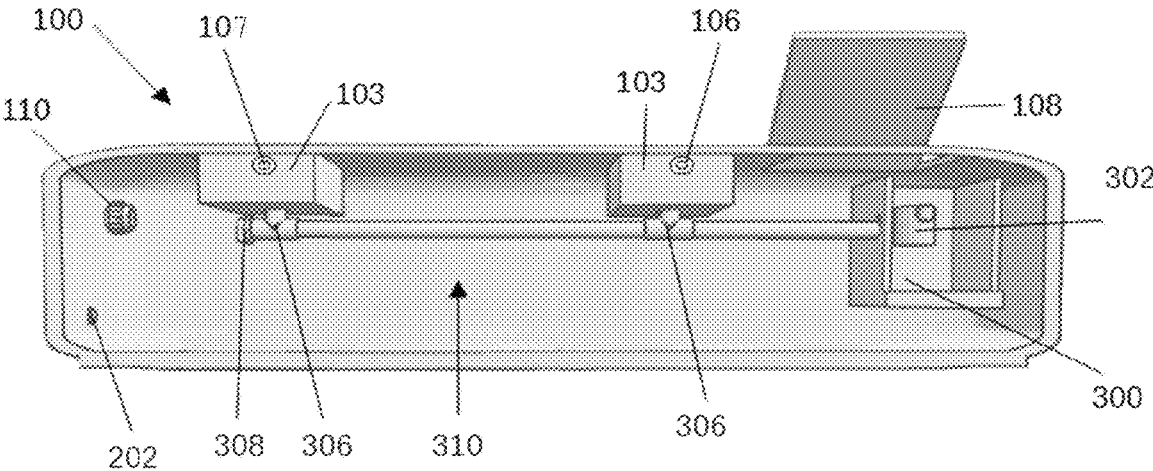
FIG. 25 perspective front cutaway view of a temperature regulated liquid container along line B-B of FIG. 23, according to another embodiment.

FIG. 25 is a perspective cutaway view of container 100 as depicted in FIG. 23, illustrating the internal plumbing components and discussed in the details of at least FIG. 20.

Figure 26:
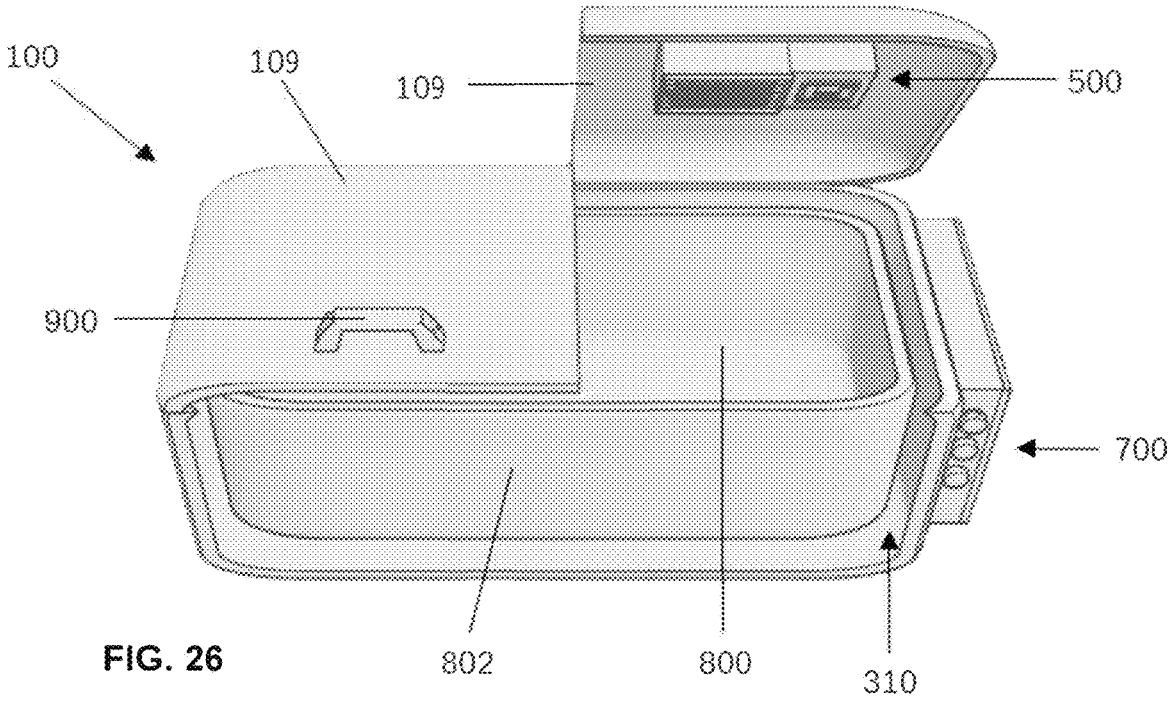
FIG. 26 is a perspective cutaway view of a temperature regulated liquid container, according to one embodiment.

FIG. 26 is a perspective cutaway view of an alternative embodiment of the invention. In this example, container 100 may be void of internal or external plumbing components and may be utilized as a storage medium for temperature sensitive liquid containers or other products or items. With rotational molding, or other form of manufacturing, it is possible to produce a secondary cavity 800 having a cavity wall 802, within cavity 310. A hollow space, surrounding secondary cavity 800, is created between the interior surface of container 100 and wall 802. This hollow space, naturally filled with air, acts as an insulator, providing an additional barrier against cold temperatures affecting the items placed within secondary cavity 800. A plurality of panels 109 may be pivotably coupled or releasably attached to the exterior body of container 100, allowing access to cavity 310 and secondary cavity 800. Panel(s) 109 may include a handle 900. According to this embodiment, heating module 500 is coupled to an underside portion, or interior facing surface of panel 109, but may be positioned elsewhere within cavity 800. Control module 700 is coupled to an exterior body portion of container 100, but may be disposed within cavity 800. An external AC or DC electrical supply is required.

FIG. 26 is a perspective cutaway view of a further embodiment of the liquid container shown in FIG. 22. In this example, container 100 utilizes secondary cavity 800 as discussed per FIG. 25.

FIG. 11 is a perspective view of a heating module of container 100. In this example, heating module 500 comprises a housing 502, a positive temperature coefficient heating element (PTC) 504, a fan 506, a first temperature control device 508 including a first temperature probe 508A and an electrical buss 510. Housing 502 may be a molded, compartmentalized unit. The PTC heating element 504 creates heat when an electric current passes through the element 504. It has a positive resistance change when exposed to an increasing temperature. As the element 504 is exposed to more heat, a ceramic material restricts the passage of the current through the component. Conversely, when exposed to a lower temperature, it will increase the passage of current. The PTC 504 is able to create, maintain, and/or self-monitor heat.

Fan 506 may be positioned in close proximity, disposed above or below element 504. First device 508 may be placed adjacent within housing 502. Element 504 and fan 506 are electrically connected to first device 508. First device 508 is electrically connected to buss 510. Buss 510 is electrically connected to an external power source. First device 508 may be directly connected to an external power source without buss 510. Element 504, fan 506 and first device 508 may operate on AC or DC current.

Figure 27:
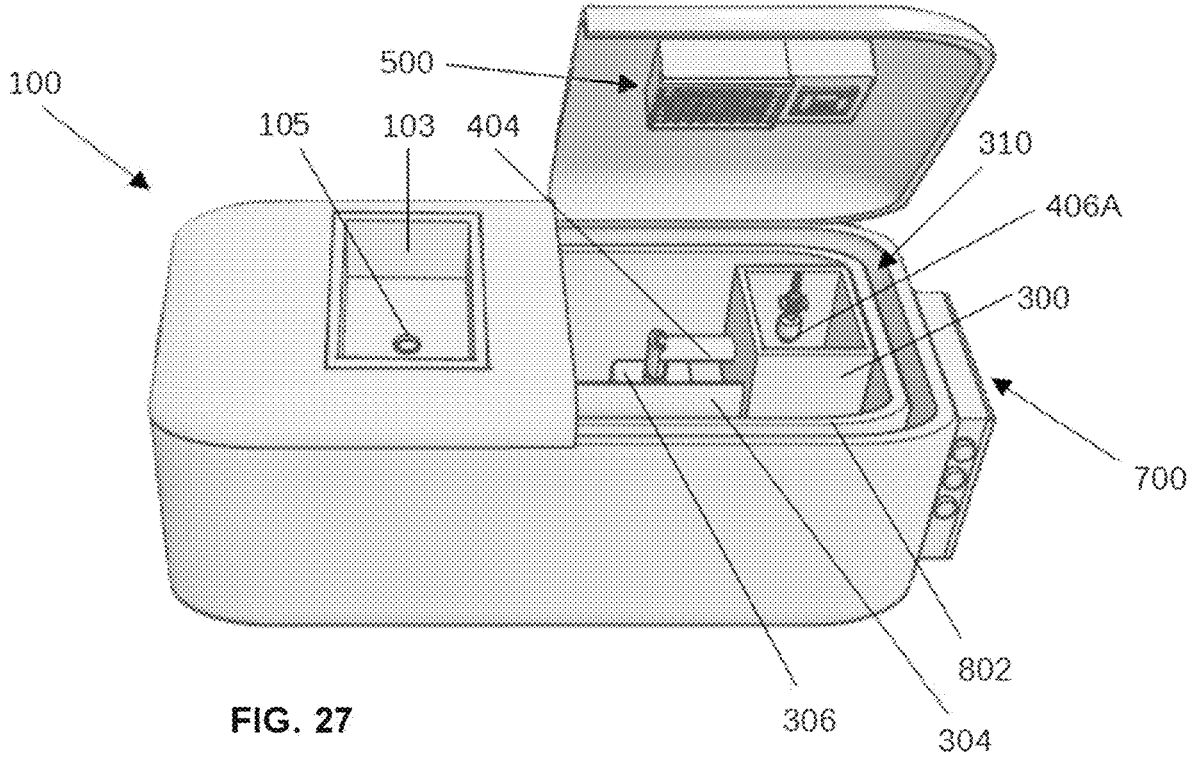
FIG. 27 is a is a perspective cutaway view of a temperature regulated liquid container, according to one embodiment.

In operation, first device 508, may be configured with a user defined low temperature set point and a high temperature set point in order for first probe 508A to monitor air temperature within cavity 310 for triggering the heating cycle of heating module 500. As an example, a user defined low set point of 35 degrees Fahrenheit and a high set point of 40 degrees Fahrenheit. Cavity 310 is filled with water to a predetermined maximum level, thus leaving space for a small pocket of air between the interior underside of container 100 and the surface of the water within cavity 310. Electrical power is supplied to heating module 500. When the ambient environmental temperature surrounding container 100 is low enough to cause the internal temperature within cavity 310 to reach the user-defined low set point of 35 degrees Fahrenheit as determined by first probe 508A, first device 508 closes its internal relay to switch power on to buss 510, which in turn, switches power on, in tandem, to fan 506 and element 504. Fan 506 circulates heat radiating from element 504 into cavity 310 to prevent the water from freezing. Conversely, when the internal temperature within cavity 310 reaches the used defined high set point of, for example, 40 degrees Fahrenheit as determined by first probe 508A, first device 508 opens its internal relay and switches power off to buss 510, which terminates power to heating module 500. This cycle of intermittent heating and cooling continues until the ambient environmental temperature surrounding container 100 becomes high enough to allow the internal temperature of cavity 310 to remain above the user defined low set point of 35 degrees Fahrenheit. Heating module 500 will maintain this 5 degree Fahrenheit temperature differential within cavity 310 regardless of how low or how high the water level is in cavity 310 and regardless of the ambient environmental temperature surrounding container 100. A thermostat or other temperature monitoring means may be substituted for first device 508 and first probe 508A. Possible placement for heating module 500 are shown in FIG. 22, FIG. 26, FIG. 27 and FIG. 35. In FIG. 26 and FIG. 27, heating module 500 may circulate heated air into cavity 310 and cavity 800.

Figures 28, 29, 30:
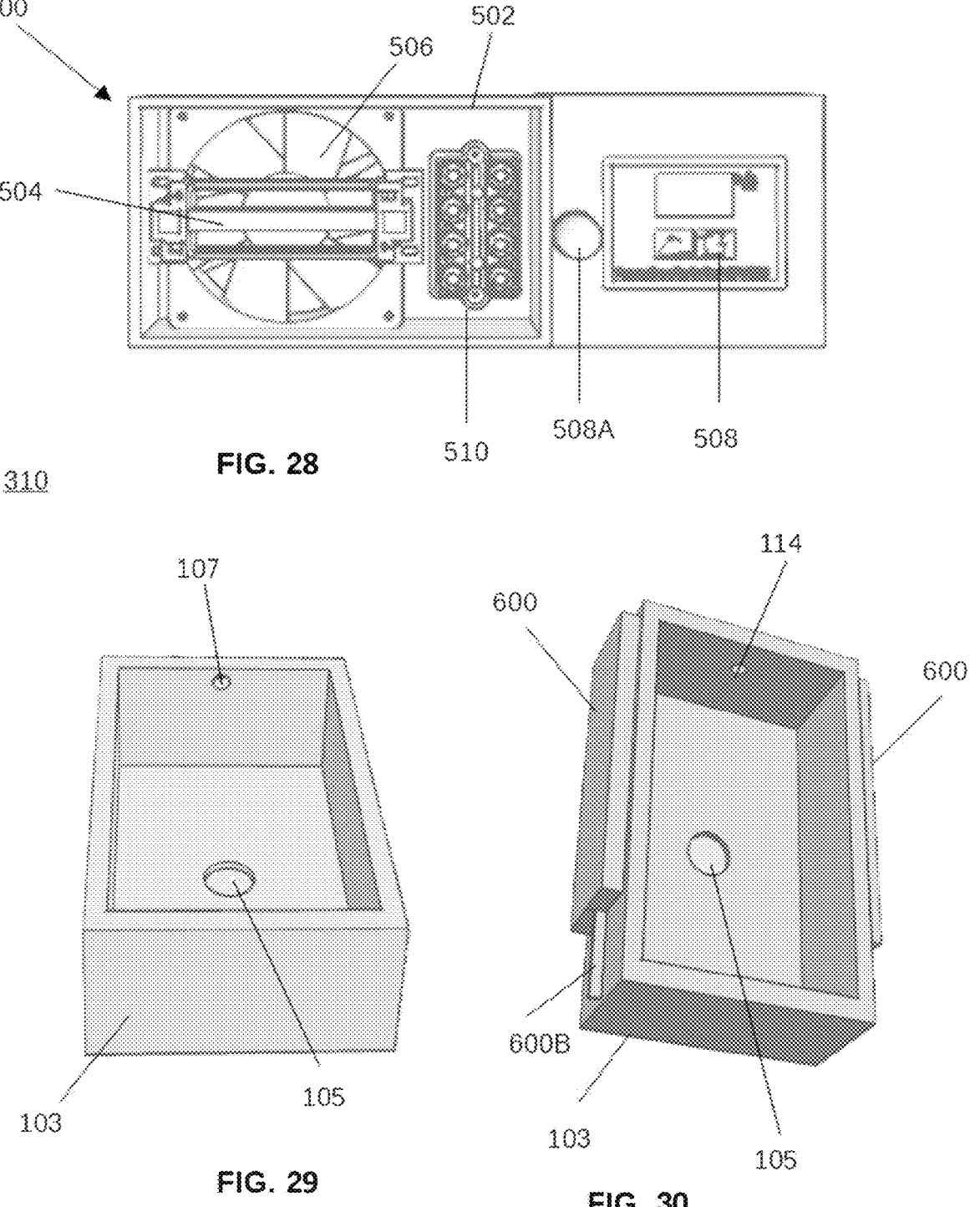
FIG. 28 is a perspective view of an embodiment of a heating module component of a temperature regulated liquid container, according to one embodiment.
FIG. 29 is a perspective view of an embodiment of a watering bowl of a temperature regulated liquid container, according to one embodiment.
FIG. 30 is a perspective view of an embodiment of a watering bowl of a temperature regulated liquid container, according to another embodiment.

FIG. 29 is a perspective view of a watering bowl 103, with an intake opening 105 and a discharge opening 107, according to a further embodiment of container 100. Watering bowl 103 may be an open topped container for holding a liquid, such as water. Watering bowl 103 may be formed in different sizes, shapes or materials by rotational molding or other methods of manufacturing. Opening 105 allows water to enter watering bowl 103 when coupled to connector 306 and water distribution tube 304. Discharge opening 107, may be positioned above the maximum, predetermined, high water level for water contained in watering bowl 103. In the event the water level exceeds this predetermined high water level, water may exit through discharge opening 107. Animals have access for drinking through the open, upper portion of watering bowl 103.

FIG. 13 is a perspective view of watering bowl 103, with intake opening 105, a probe opening 114, and a flexible heating pad 600 coupled with an external electrical connector 600B. according to a further embodiment of watering bowl 103. Watering bowl 103 may be an open topped container for holding a liquid, such as water. In this example, watering bowl 103 may be formed from a metallic material in different sizes or shapes.

Pad 600 is well known, comprising a heating element, usually encased within a silicone covering. When an electric current is introduced to pad 600 via electrical connector 600B, the internal heating element begins warming up, eventually reaching its maximum rated high temperature. A plurality of pad(s) 600 are coupled to opposing, exterior sides of watering bowl 103, at or near the maximum high water level. Due to the metallic construction of watering bowl 103 in this example, when pad(s) 600 are in heating mode, the radiated heat is conducted through and by the surface of watering bowl 103. Water contained in watering bowl 103 will be heated as a result of this arrangement. Less electrical energy is required for heating a small volume of water in watering bowl 103.

Pad(s) 600 are electrically connected to a second device 508 coupled with a second probe 508A. The temperature monitoring portion of second probe 508A is inserted through probe opening 114, protruding into the water containment area of watering bowl 103. When watering bowl 103 is filled, second probe 508A is submerged, thereby allowing monitoring of the water temperature within watering bowl 103. Second device 508, may be configured with a user defined low temperature set point and a high temperature set point in order for the second probe 508A to monitor water temperature for triggering the heating cycle of heating pad(s) 600. As an example, a user defined low set point of 35 degrees Fahrenheit and a high set point of 40 degrees Fahrenheit. When the ambient environmental temperature surrounding watering bowl 103 is low enough to cause the water temperature to reach the user defined low set point of 35 degrees Fahrenheit as determined by second probe 508A, second device 508 closes its internal relay to switch power on to pad(s) 600. Conversely, when the water temperature within watering bowl 103 reaches the user defined high set point of, for example, 40 degrees Fahrenheit as determined by second probe 508A, second device 508 opens its internal relay and switches power off to pad(s) 600. This cycle of intermittent heating and cooling continues until the ambient environmental temperature surrounding watering bowl 103 becomes high enough to allow the water temperature to remain above the user defined low set point of 35 degrees Fahrenheit. The water temperature within watering bowl should remain above freezing regardless of the ambient environmental temperature surrounding container 100. A thermostat or other temperature monitoring means may be substituted for second device 508 and second probe 508A. Pad 600 may operate on AC or DC electrical current.

Figures 31, 32, 33:
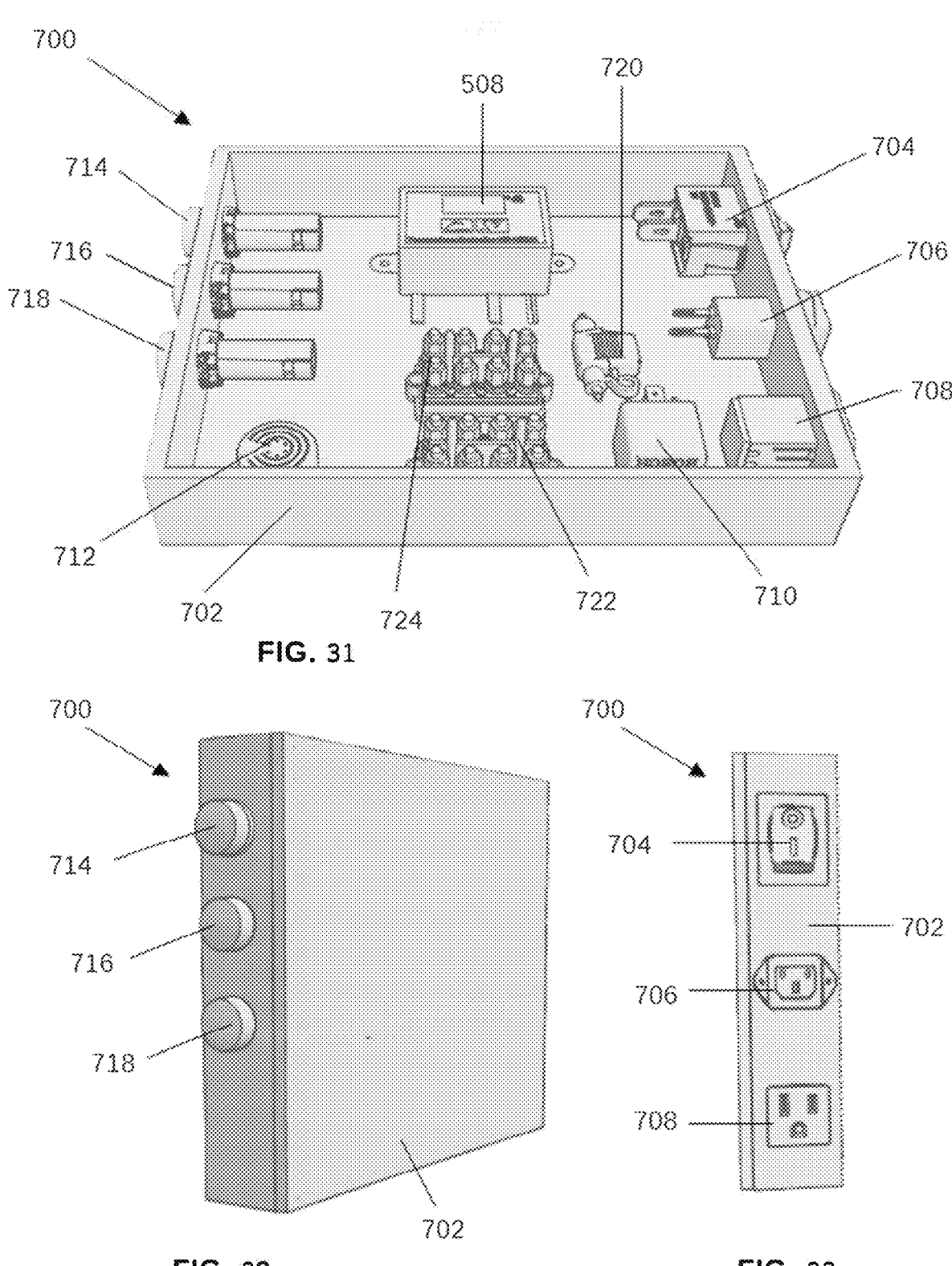
FIG. 31 is a perspective view of an embodiment of an electrical control module, according to one embodiment.
FIG. 32 is a perspective view of an embodiment of an electrical control module, according to one embodiment.
FIG. 33 is a perspective view of a rear connection panel of an electrical control module, according to one embodiment.

FIG. 31 is a perspective view of an electrical control module 700 according to a further embodiment of container 100. Control module 700 comprises a housing 702 to protect electrical components, a main on/off power switch 704, a male electrical plug 706 for accepting input from an external electrical connection, a female electrical plug 708 for routing an electrical current out of module 700, a relay 710 which allows low current switch 406A, to provide a higher operating current to pump 402, an audible buzzer 712 for alerting users of a low water situation, a main power lighted on/off indicator 714 (may be green in color) to indicate components are energized, a heating module lighted on/off indicator 716 (may be amber in color) to indicate heating module 500 is active, a flexible heating pad lighted on/off indicator 718 (may be red in color) to indicate pad 600 is in heating mode, a fuse 720 for protecting components from electrical overload, a hot buss bar 722 for component electrical connections, and a neutral buss bar 724 for component electrical connections. A secondary relay 710 (not shown) is provided for switches 406B and 406C for the same purposes as stated above and may be housed within housing 702. Second device 508 is electrically connected to buss 722 and 724 providing power to pad(s) 600. First device 508, as discussed above in FIG. 28, is electrically connected to buss 722 and 724 via buss 510, providing power to heating module 500, may be housed within housing 702. DC components may be substituted for the AC components illustrated in this example. Module 700 may be coupled to an interior portion of container 100 within cavity 310 an/or cavity 800. Module 700 may be coupled to an exterior portion of container 100.

FIG. 32 is a perspective view of the front portion of electrical control module 700 as shown in FIG. 31. The front panel of module 700 offers a user a visual representation regarding the operating status of the electrical components as discussed above.

FIG. 33 is a perspective view of the rear panel of module 700 as shown in FIG. 31. The rear panel of module 700 offers main power switch, electrical input and output options as discussed above.

Figures 34, 35:
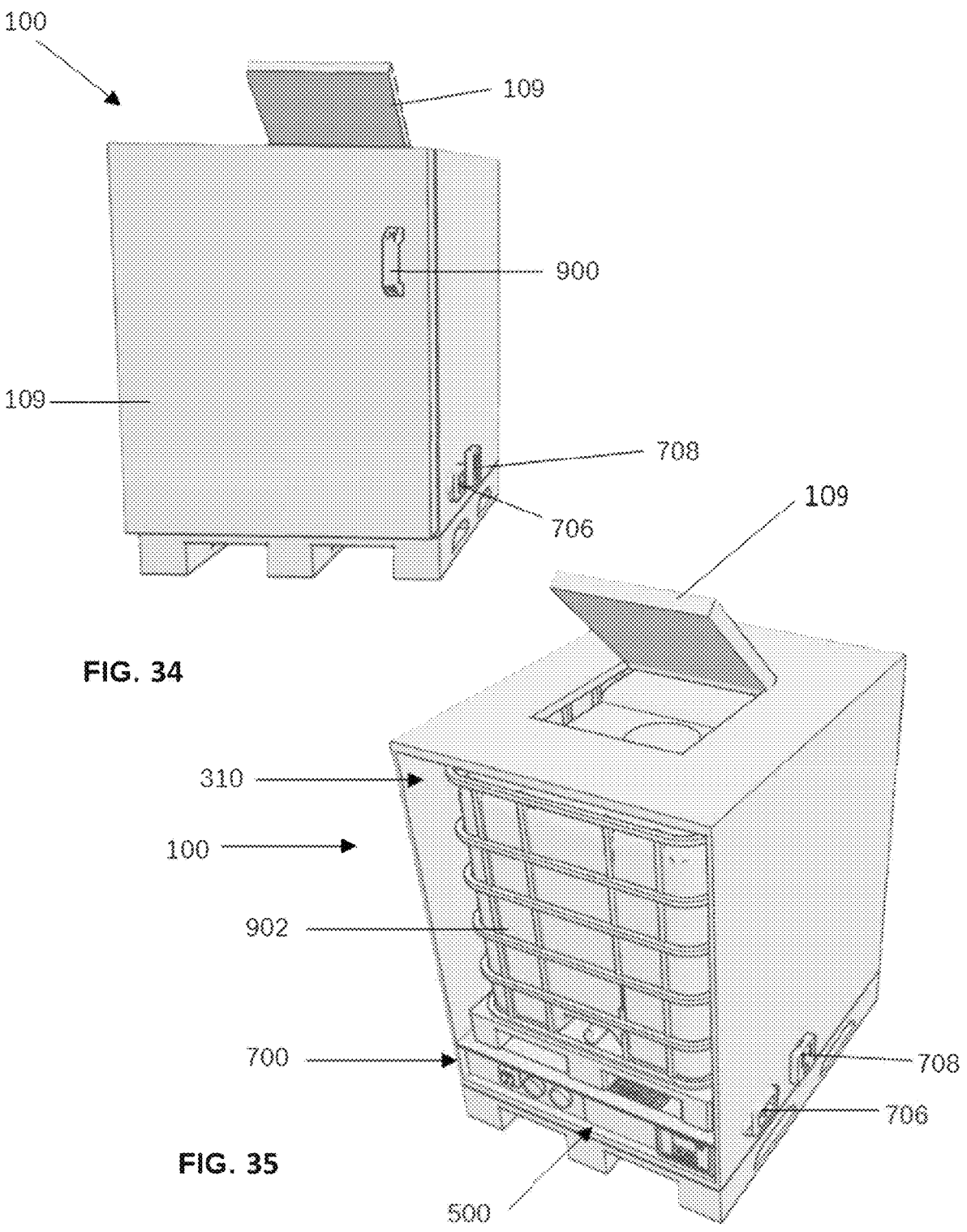
FIG. 34 is a perspective view of another embodiment of a temperature regulated liquid container, according to one embodiment.
FIG. 35 is a perspective view of an embodiment of a temperature regulated liquid container, according to one embodiment.

FIG. 34 is a perspective view of container 100 according to a further embodiment of the temperature regulated liquid container. In this example, container 100 comprises a plurality of panel(s) 109, cavity 310, male plug 706, female plug 708 and handle 900. Panel(s) 109 may be pivotably coupled or releasably attached.

FIG. 35 is a perspective view of container 100 as depicted in FIG. 17 with front panel 109 removed. In this example, cavity 310 is utilized for protecting and storing a large volume of liquid contained within a separate container. In this embodiment, the separate container is represented by an intermediate bulk container 902. An intermediate bulk container (or IBC, tote) is a pallet mounted, industrial grade, reusable container used for storing and transporting bulk liquids. Livestock owners, in some instances, use totes 902 to store water for animals due to their approximate 250-300 gallon water capacity and the ability for transport to remote areas of land. Totes are commonly used by off grid homesteaders in the collection of rain water. In either case, totes 902, are susceptible to several problems associated with open animal stock tanks. Algae growth in warm climates due to sunlight and frozen water in cold climates. Container 100 may be manufactured with cavity 310 large enough to accommodate heating module 500, control module 700 and storage of tote 902 or containers of other temperature sensitive liquids or materials.

Figure 36:
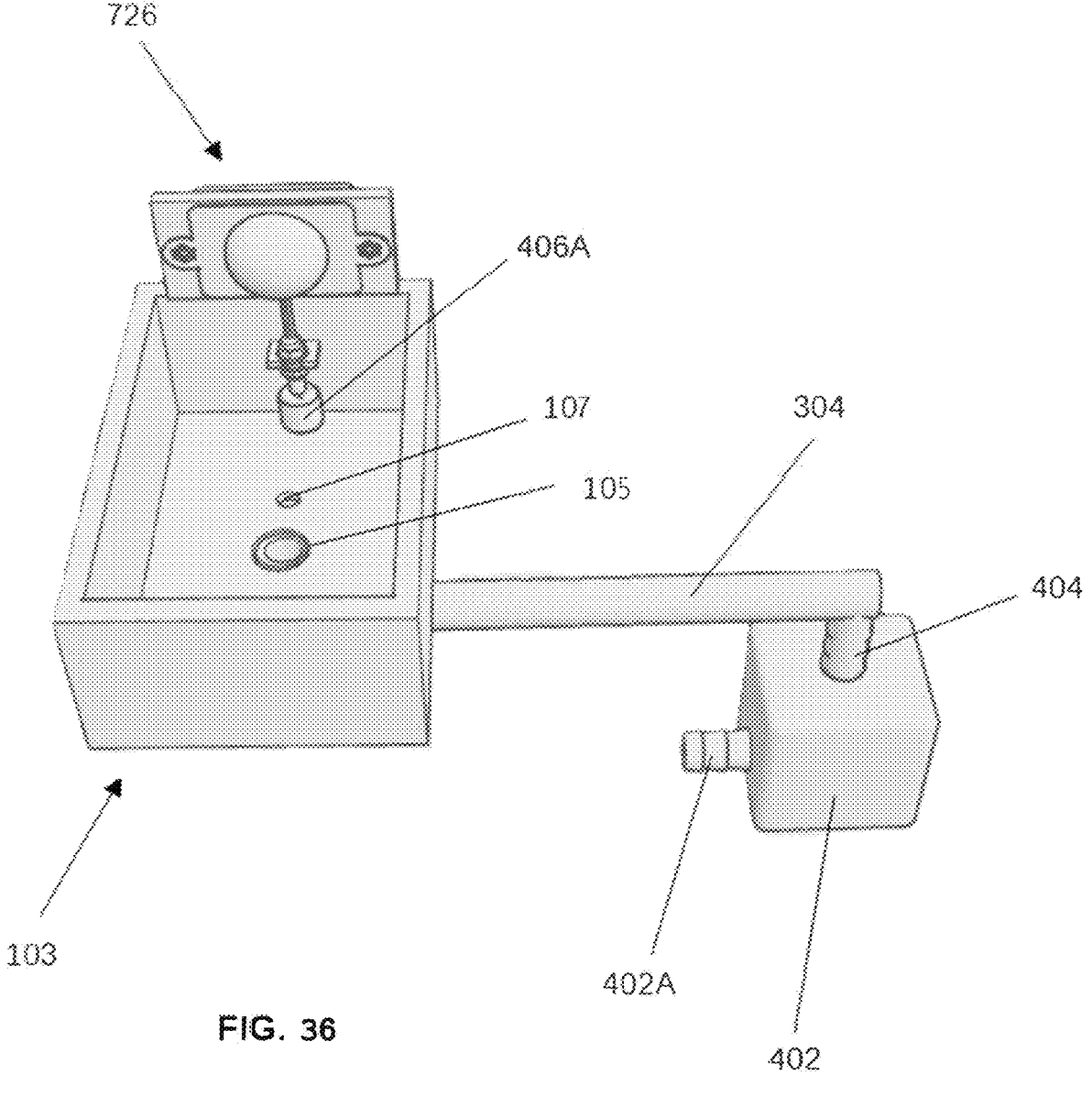
FIG. 36 is a perspective view of an embodiment of a watering bowl of a temperature regulated liquid container, according to one embodiment.

FIG. 36 is a perspective view of watering bowl 103 according to a further embodiment of the present invention. In this embodiment, a passive infrared sensor (PIR) 726, may be utilized to facilitate automated filling of watering bowl 103 when an animal approaches container 100 for a drink. Discharge opening 107 may be located adjacent to water intake opening 105, below the maximum water level. Float switch 406A may be coupled to an interior portion of watering bowl 103, in a location determining the maximum water level permitted within watering bowl 103. Passive infrared sensor (PIR) 726, may be coupled to watering bowl 103, as shown, or may be otherwise attached to an exterior body portion of container 100. PIR 726, float switch 406A and pump 402 are electrically connected to control module 700. When an animal is in close enough proximity to trigger an "on" sensor within PIR 726, an electrical connection from control module 700, via float switch 406A, is completed, activating power to pump 402. Pump 402 transfers water from cavity 310, through water pump intake tube 402A, water pump discharge tube 404, water distribution tube 304 and water intake opening 105 to watering bowl 103. When the maximum water level within watering bowl 103 is met, as determined by float switch 406A, float switch 406A disconnects the electrical connection between pump 402 and control module 700. After completion of the watering bowl filling cycle, water drains by gravity, through discharge opening 107 for reclamation into cavity 310. As an alternative, watering bowl 103 may be void of discharge opening 107 and water may be drained, by gravity, into cavity 310 through water distribution tube 304, discharge tube 404 and intake tube 402A. PIR 726 may operate on AC or DC electrical current.

While the various systems described above are separate implementations, any of the individual components, mechanisms, or devices, and related features and functionality, within the various system embodiments described in detail above can be incorporated into any of the other system embodiments herein.

The terms "about" and "substantially," as used herein, refers to variation that can occur (including in numerical quantity or structure), for example, through typical measuring techniques and equipment, with respect to any quantifiable variable, including, but not limited to, mass, volume, time, distance, wavelength, frequency, voltage, current, and electromagnetic field. Further, there is certain inadvertent error and variation in the real world that is likely through differences in the manufacture, source, or precision of the components used to make the various components or carry out the methods and the like. The terms "about" and "substantially" also encompass these variations. The term "about" and "substantially" can include any variation of 5% or 10%, or any amount—including any integer—between 0% and 10%. Further, whether or not modified by the term "about" or "substantially," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A temperature-regulated liquid container comprising:
(a) a container body forming a first cavity;
(b) a bowl body forming a second cavity, the bowl body being disposed within the first cavity and the second cavity being externally accessible from the container body;
(c) a bowl heating element coupled to an exterior surface of the bowl body;
(d) an electrical control module disposed on a surface of the container body;
(e) a temperature regulation system body;
(f) a temperature regulation system disposed on the temperature regulation system body, the temperature regulation system comprising:
(i) a cavity heating element;
(ii) a fan adjacent the cavity heating element, the fan being configured to move air adjacent the cavity heating element;
(iii) a first temperature sensor configured to generate a first signal;
(iv) a second temperature sensor configured to generate a second signal;
(v) a first temperature control device having a first high temperature threshold and first low temperature threshold, the first temperature control device being in electrical communication with the first temperature sensor and the cavity heating element such that the first temperature control device receives the first signal; and
(vi) a second temperature control device having a second high temperature threshold and second low temperature threshold, the second temperature control device being in electrical communication with the bowl heating element and the second temperature sensor such that the second temperature control device receives the second signal; and (g) a liquid distribution system disposed within the first cavity, the liquid distribution system comprising:
   (i) a liquid level container comprising a liquid level sensor;
   (ii) a pump configured to pump liquid to the liquid level container; and
   (iii) a liquid distribution tube configured to direct a liquid from the liquid level container to the bowl body,
wherein the fan, the first and second temperature control devices, and heating elements are each in electrical communication with the electrical control module.

2. The temperature-regulated liquid container of claim 1, wherein:
   in response to a sensed temperature of at least one of the first cavity and the second cavity being below a first and second low temperature threshold, the temperature regulation system is configured to activate at least one of the bowl heating element and the cavity heating element, and
   in response to a sensed temperature associated with at least one of the first cavity and the second cavity being above a first and second high temperature threshold, the temperature regulation system is configured to not provide power to at least one of the bowl heating element and the cavity heating element.

3. The temperature-regulated liquid container of claim 2, wherein the first low temperature threshold and the first high temperature threshold each comprise a different value from one another and wherein the second low temperature threshold and the second high temperature threshold each comprise a different value from one another.

4. The temperature-regulated liquid container of claim 1, wherein the second temperature sensor is disposed within the bowl body and is configured to be submersible within a liquid.

5. The temperature-regulated liquid container of claim 1, wherein the liquid distribution system further comprises:
   (a) a discharge tube fluidly connecting the pump to the liquid level container; and
   (b) a fluid discharge tube fluidly connecting the liquid level container to the bowl body.

6. The temperature-regulated liquid container of claim 1, wherein at least one of first temperature control device and second temperature control device comprise a thermostat.

7. The temperature-regulated liquid container of claim 1, wherein the liquid distribution system is disposed within the first cavity.

8. The temperature-regulated liquid container of claim 7, wherein the liquid level container comprises a float switch at a maximum liquid level location, the float switch being in electrical communication with the electrical control module.

9. The temperature-regulated liquid container of claim 8, wherein:
   in response to sensed liquid at the maximum liquid level location, the float switch is configured to communicate to the electrical control module to terminate a supply of electricity to the pump, and
   in response to not sensing liquid at the maximum liquid level location, the float switch is configured to communicate to the electrical control module to supply electricity to the pump.

10. The temperature-regulated liquid container of claim 9, wherein the liquid level container comprises a float valve disposed at a location associated with an upper liquid level threshold.

11. A liquid container, comprising:
   (a) a container body forming a first cavity;
   (b) a bowl body forming a second cavity, the bowl body being disposed within the first cavity and the second cavity being externally accessible from the container body;
   (c) an electrical control module;
   (d) a liquid distribution system disposed within the first cavity, the liquid distribution system comprising:
      (i) a liquid level container comprising a liquid level sensor;
      (ii) a pump configured to pump liquid to the liquid level container and receive electricity from the electrical control module; and
      (iii) a liquid distribution tube configured to direct a liquid from the liquid level container to the bowl body, and
   (e) a passive infrared sensor disposed on a surface of the liquid container and configured to detect a presence of an animal in a vicinity associated with the container body, wherein the passive infrared sensor is in electronic communication with the electrical control module such that a liquid is directed to the bowl body when an animal is sensed in the vicinity of the liquid container.

12. The liquid container of claim 11, wherein the bowl body comprises a liquid inlet in fluidic communication with the liquid distribution tube.

13. The liquid container of claim 11, wherein the liquid level sensor comprises a liquid control valve at a maximum liquid level and coupleable to an external liquid supply connection, and wherein:
   the liquid control valve is configured to prevent liquid from entering the first cavity when liquid is at the maximum liquid level, and
   the valve is configured to allow liquid to enter the liquid level container when water is not at the maximum liquid level.

14. The liquid container of claim 13, wherein the liquid control valve comprises a base, and wherein the maximum liquid level is defined by the position of the base.

15. The liquid container of claim 13, wherein the liquid control valve comprises an automatic liquid control valve.

16. The liquid container of claim 11, wherein the liquid level sensor comprises float valve within the liquid level container, wherein the float valve is disposed at a location defining a maximum liquid level.

17. A temperature regulated liquid container comprising:
   (a) a container body forming a cavity;
   (b) a temperature control system body;
   (c) an electrical control module; and
   (d) a temperature regulation system disposed on the temperature control system body, the temperature regulation system comprising:
      (i) a cavity heating element;
      (ii) a fan adjacent the cavity heating element, the fan being configured to move air adjacent the cavity heating element;
      (iii) a temperature sensor configured to generate a signal;
      (iv) a temperature control device having a high temperature threshold and low temperature threshold, the temperature control device being in electrical communication with the cavity heating element and the temperature sensor such that the temperature control device receives the signal, (e) a liquid distribution system disposed within the cavity, the liquid distribution system comprising:

(i) a liquid level container comprising a liquid level sensor;

(ii) a pump configured to pump liquid from the liquid level container; and (iii) a liquid distribution tube configured to direct a liquid from the liquid level container;

wherein the fan, the temperature control device, and cavity heating element are each in electrical communication with the electrical control module.

18. The temperature regulated liquid container of claim 17, wherein:

in response to a sensed temperature of the cavity being below the low temperature threshold, the temperature regulation system is configured to activate the cavity heating element, and in response to a sensed temperature associated with the cavity being above the high temperature threshold, the temperature regulation system is configured to not provide power to the cavity heating element.

19. The temperature regulated liquid container of claim 17, further comprising a thermostat configured to control the temperature regulation system.

20. The temperature regulated liquid container of claim 17, further comprising a bowl body forming a second body;

wherein the liquid distribution system further comprises an external liquid connection to direct a liquid to the liquid level container; and wherein the liquid distribution tube is configured to direct the liquid from the liquid level container to the second cavity.

\* \* \* \* \*